(12) United States Patent
Kayanuma et al.

(10) Patent No.: US 11,143,128 B2
(45) Date of Patent: Oct. 12, 2021

(54) EXHAUST PURIFICATION SYSTEM OF INTERNAL COMBUSTION ENGINE

(71) Applicant: TOYOTA JIDOSHA KABUSHIKI KAISHA, Aichi-ken (JP)

(72) Inventors: Ryosuke Kayanuma, Susono (JP); Kenji Furui, Shizuoka-ken (JP); Koichiro Fukuda, Numazu (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/726,246

(22) Filed: Dec. 24, 2019

(65) Prior Publication Data

US 2020/0208586 A1   Jul. 2, 2020

(30) Foreign Application Priority Data

Dec. 26, 2018   (JP) .............................. JP2018-243444

(51) Int. Cl.
    *F02D 41/02*   (2006.01)
    *F01N 11/00*   (2006.01)
    *F01N 3/08*    (2006.01)

(52) U.S. Cl.
    CPC ....... *F02D 41/0295* (2013.01); *F01N 3/0864* (2013.01); *F01N 11/007* (2013.01); *F01N 2570/16* (2013.01); *F01N 2900/1624* (2013.01)

(58) Field of Classification Search
    CPC combination set(s) only.
    See application file for complete search history.

(56) References Cited

U.S. PATENT DOCUMENTS

| | | | |
|---|---|---|---|
| 8,826,642 | B2* | 9/2014 | Aisaka ................. F01N 3/0864 60/276 |
| 10,054,020 | B2* | 8/2018 | Yoshida ............... F01N 3/0814 |
| 10,072,545 | B2* | 9/2018 | Hirooka ............... F01N 3/0885 |
| 10,288,000 | B2* | 5/2019 | Masubuchi .......... F02D 41/027 |
| 2002/0157379 | A1* | 10/2002 | Kakuyama ......... B01D 53/9495 60/276 |
| 2010/0186386 | A1* | 7/2010 | Tsujimoto ............ F01N 3/0814 60/286 |
| 2017/0175656 | A1* | 6/2017 | Masubuchi .......... F01N 3/0864 |

FOREIGN PATENT DOCUMENTS

JP   2014-213715 A   11/2014

* cited by examiner

*Primary Examiner* — Binh Q Tran
(74) *Attorney, Agent, or Firm* — Hauptman Ham, LLP

(57) ABSTRACT

An exhaust purification system of an internal combustion engine includes a catalyst arranged in an exhaust passage of the internal combustion engine and able to store oxygen, a storage amount calculating part configured to calculate an oxygen storage amount of the catalyst, a poisoning amount calculating part configured to calculate a poisoning amount of the catalyst, and an oxygen amount control part configured to control an amount of oxygen supplied to the catalyst based on the oxygen storage amount and the poisoning amount.

15 Claims, 26 Drawing Sheets

EXHAUST PURIFICATION SYSTEM OF INTERNAL COMBUSTION ENGINE

RELATED APPLICATIONS

The present application claims priority of Japanese Patent Application No. 2018-243444, filed Dec. 26, 2018, the disclosure of which is hereby incorporated by reference herein in its entirety.

FIELD

The present invention relates to an exhaust purification system of an internal combustion engine.

BACKGROUND

In the past, it has been known to purify exhaust gas by providing a catalyst able to store oxygen in an exhaust passage of an internal combustion engine.

In the internal combustion engine described in PTL 1, when an oxygen storage amount of a catalyst is equal to or less than a threshold value, an opening degree of a throttle valve is made larger, while when the oxygen storage amount of the catalyst is larger than the threshold value, the opening degree of the throttle valve is made smaller. As a result, when the oxygen storage amount of the catalyst is equal to or less than the threshold value, the amount of supply of oxygen to the catalyst becomes larger, while when the oxygen storage amount of the catalyst is larger than the threshold value, the amount of supply of oxygen to the catalyst becomes smaller. By doing this, the exhaust purification performance of the catalyst is enhanced and exhaust emissions are kept from deteriorating.

CITATIONS LIST

Patent Literature

[PTL 1] Japanese Unexamined Patent Publication No. 2014-213715

SUMMARY

Technical Problem

However, in the internal combustion engine described in PTL 1, when controlling the amount of supply of oxygen to the catalyst, the amount of poisoning of the catalyst is not considered at all. For this reason, the oxygen storage amount of the catalyst is liable to deviate from the suitable value.

Therefore, in consideration of the above problem, an object of the present invention is to improve exhaust emission in an internal combustion engine provided with a catalyst which can store oxygen.

Solution to Problem

The summary of the present disclosure is as follows.

(1) An exhaust purification system of an internal combustion engine comprising: a catalyst arranged in an exhaust passage of the internal combustion engine and able to store oxygen, a storage amount calculating part configured to calculate an oxygen storage amount of the catalyst, a poisoning amount calculating part configured to calculate a poisoning amount of the catalyst, and an oxygen amount control part configured to control an amount of oxygen supplied to the catalyst based on the oxygen storage amount and the poisoning amount.

(2) The exhaust purification system of an internal combustion engine described in above (1), wherein the poisoning amount calculating part is configured to calculate a rich poisoning amount of the catalyst by exhaust gas of an air-fuel ratio richer than a stoichiometric air-fuel ratio, and the oxygen amount control part is configured to control the amount of oxygen based on the rich poisoning amount.

(3) The exhaust purification system of an internal combustion engine described in above (1) or (2), wherein the poisoning amount calculating part is configured to calculate a lean poisoning amount of the catalyst by exhaust gas of an air-fuel ratio leaner than a stoichiometric air-fuel ratio, and the oxygen amount control part is configured to control the amount of oxygen based on the lean poisoning amount.

(4) The exhaust purification system of an internal combustion engine described in any one of above (1) to (3), further comprising an air feed device directly supplying air into the exhaust passage at an upstream side from the catalyst, wherein the oxygen amount control part is configured to control the amount of oxygen by changing an air amount supplied from the air feed device to the exhaust passage.

(5) The exhaust purification system of an internal combustion engine described in above (1) to (4), wherein the oxygen amount control part is configured to control the amount of oxygen by changing an air-fuel ratio of an air-fuel mixture supplied to a combustion chamber of the internal combustion engine.

(6) The exhaust purification system of an internal combustion engine described in any one of above (1) to (4), wherein the oxygen amount control part is configured to supply oxygen to the catalyst when an air-fuel mixture is not being burned in a combustion chamber of the internal combustion engine.

(7) The exhaust purification system of an internal combustion engine described in above (6), wherein the oxygen amount control part is configured to supply oxygen to the catalyst when startup of the internal combustion engine is requested.

(8) The exhaust purification system of an internal combustion engine described in above (7), wherein a vehicle mounting the internal combustion engine comprises the internal combustion engine and a motor as sources of power for driving, the exhaust purification system of an internal combustion engine further comprises an engine control part configured to control startup and stopping of the internal combustion engine, and the poisoning amount calculating part is configured to calculate a rich poisoning amount of the catalyst by exhaust gas of an air-fuel ratio richer than the stoichiometric air-fuel ratio, and the engine control part is configured to lengthen a stopped time of the internal combustion engine more when a temperature of the catalyst is equal to or more than a predetermined temperature and the rich poisoning amount is equal to or more than a predetermined value, compared to when the temperature of the catalyst is less than the predetermined temperature or the rich poisoning amount is less than the predetermined value.

(9) The exhaust purification system of an internal combustion engine described in above (8), wherein the engine control part is configured to start up the internal combustion engine when a state of charge of a battery supplying electric power to the motor falls to a lower limit threshold value, and lower the lower limit threshold value more when the temperature of the catalyst is equal to or more than the predetermined temperature and the rich poisoning amount is equal to or more than the predetermined value, compared to when the temperature of the catalyst is less than the predetermined temperature or the rich poisoning amount is less than the predetermined value.

(10) The exhaust purification system of an internal combustion engine described in above (9), wherein the engine control part is configured to lower the lower limit threshold value more when, at the time of stopping the internal combustion engine, the temperature of the catalyst is equal to or more than the predetermined temperature and the rich poisoning amount is equal to or more than the predetermined value, compared to when, at the time of stopping the internal combustion engine, the temperature of the catalyst is less than the predetermined temperature or the rich poisoning amount is less than the predetermined value.

(11) The exhaust purification system of an internal combustion engine described in above (8), wherein the engine control part is configured to start up the internal combustion engine when a state of charge of a battery supplying electric power to the motor falls to a lower limit threshold value, make the internal combustion engine stop when the state of charge of the battery rises to an upper limit threshold value, and raise the upper limit threshold value more when the temperature of the catalyst is equal to or more than the predetermined temperature and the rich poisoning amount is equal to or more than the predetermined value, compared to when the temperature of the catalyst is less than the predetermined temperature or the rich poisoning amount is less than the predetermined value.

(12) The exhaust purification system of an internal combustion engine described in any one of above (6) to (11), further comprising a motoring device for driving rotation of a crankshaft of the internal combustion engine, wherein the oxygen amount control part is configured to control the amount of oxygen by changing a time during which the motoring device drives rotation of the crankshaft.

(13) The exhaust purification system of an internal combustion engine described in any one of above (6) to (12), further comprising a motoring device for driving rotation of a crankshaft of the internal combustion engine, wherein the oxygen amount control part is configured to control the amount of oxygen by changing an opening degree of a throttle valve arranged in an intake passage of the internal combustion engine when the motoring device drives rotation of the crankshaft.

Advantageous Effects of Invention

According to the present invention, it is possible to improve exhaust emission in an internal combustion engine provided with a catalyst which can store oxygen.

DESCRIPTION OF EMBODIMENTS

Figure 1:
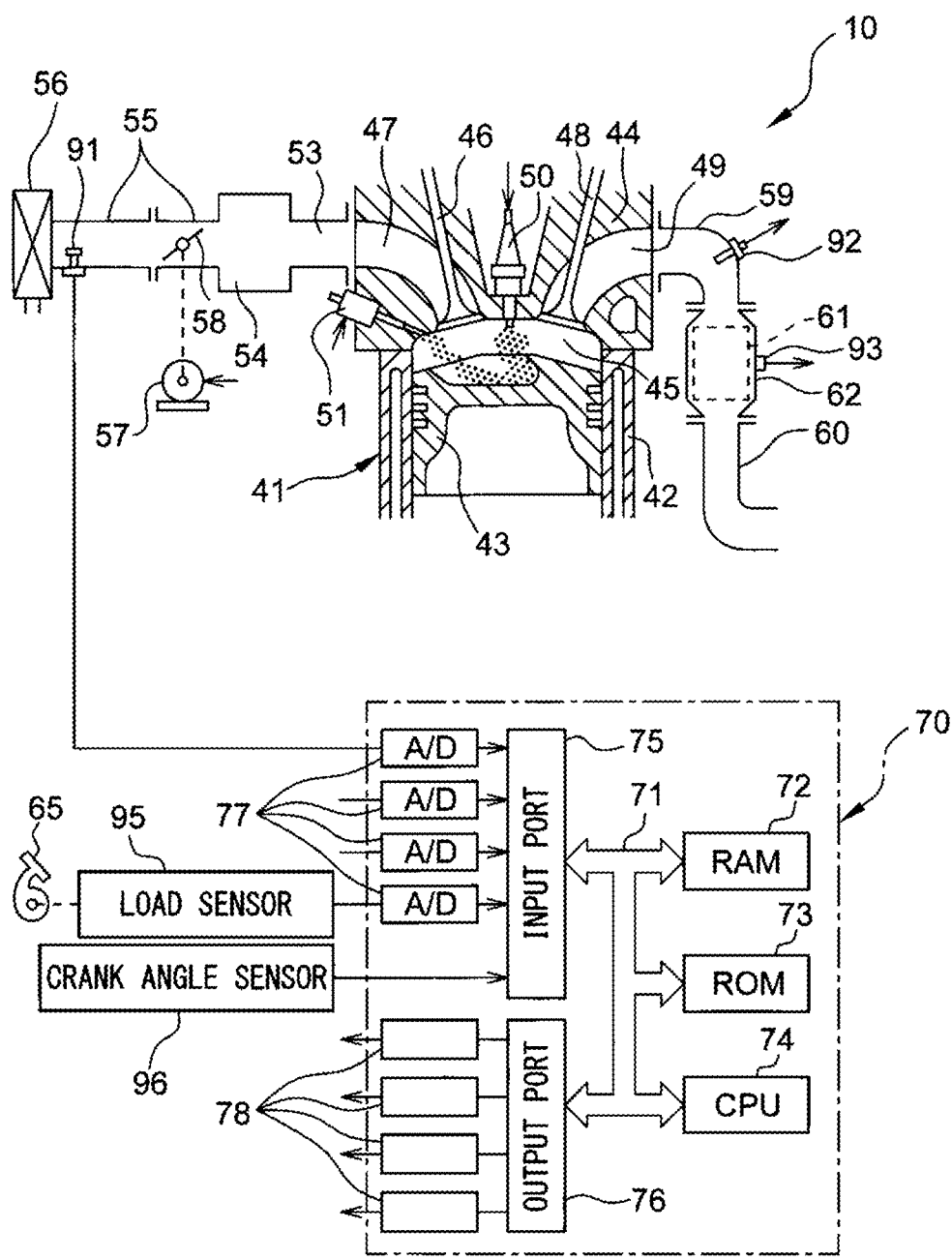
FIG. 1 is a view schematically showing an internal combustion engine to which an exhaust purification system of an internal combustion engine according to a first embodiment of the present invention is applied.

Below, referring to the drawings, embodiments of the present invention will be explained in detail. Note that, in the following explanation, similar component elements are assigned the same reference notations.

First Embodiment

Below, referring to FIG. 1 to FIG. 13, a first embodiment of the present invention will be explained.

<Configuration of Internal Combustion Engine>

FIG. 1 is a view schematically showing an internal combustion engine to which an exhaust purification system of an internal combustion engine according to the first embodiment of the present invention is applied. The internal combustion engine 10 is a spark ignition type internal combustion engine. Specifically, it is a gasoline engine fueled by gasoline. The internal combustion engine 10 is mounted in a vehicle.

The internal combustion engine 10 is provided with an engine body 41 including a cylinder block 42 and a cylinder head 44. Inside of the cylinder block 42, a plurality of cylinders are formed. Each cylinder has a piston 43 arranged inside it reciprocating in the axial direction of the cylinder. A combustion chamber 45 is formed between the piston 43 and the cylinder head 44.

The cylinder head 44 is formed with intake ports 47 and exhaust ports 49. The intake ports 47 and exhaust ports 49 are connected to the combustion chambers 45. The internal combustion engine 10 is further provided with intake valves 46 and exhaust valves 48 arranged inside the cylinder head 44. The intake valves 46 open and close the intake ports 47, while the exhaust valves 48 open and close the exhaust ports 49.

The internal combustion engine 10 is further provided with spark plugs 50 and fuel injectors 51. The spark plugs 50 are arranged at the center parts of the inside wall surfaces of the cylinder head 44 and generate sparks corresponding to an ignition signal. The fuel injectors 51 are arranged at the peripheries of the inside wall surfaces of the cylinder head 44 and inject fuel into the combustion chambers 45 in accordance with injection signals. In the present embodiment, as fuel, gasoline with a stoichiometric air-fuel ratio of 14.6 is used.

The internal combustion engine 10 is further provided with intake runners 53, a surge tank 54, intake pipe 55, air cleaner 56, and throttle valve 58. The intake ports 47 of the cylinders are connected through respectively corresponding intake runners 53 to the surge tank 54, while the surge tank 54 is connected through the intake pipe 55 to the air cleaner 56. The intake ports 47, intake runners 53, surge tank 54, intake pipe 55, etc., form an intake passage guiding air to the combustion chambers 45. The throttle valve 58 is arranged in the intake pipe 55 between the surge tank 54 and the air cleaner 56 and is driven by a throttle valve driving actuator 57 (for example a DC motor). The throttle valve 58 can be made to turn by the throttle valve driving actuator 57 and thereby change the opening area of the intake passage corresponding to the opening degree.

The internal combustion engine 10 is further provided with an exhaust manifold 59, exhaust pipe 60, and catalyst 61. The exhaust ports 49 of the cylinders are connected to the exhaust manifold 59. The exhaust manifold 59 has a plurality of runners connected to the exhaust ports 49 and a plenum at which these runners are collected. The plenum of the exhaust manifold 59 is connected to a casing 62 housing the catalyst 61. The casing 62 is connected to the exhaust pipe 60. The exhaust port 49, exhaust manifold 59, casing 62, exhaust pipe 60, etc., form an exhaust passage for discharging exhaust gas produced by combustion of an air-fuel mixture in the combustion chambers 45.

The various control operations of the internal combustion engine 10 are performed by the electronic control unit (ECU) 70 based on the outputs of the various sensors provided at the internal combustion engine 10 etc. The ECU 70 is comprised of a digital computer which is comprised of components connected with each other through a bidirectional bus 71 such as a RAM (random access memory) 72, ROM (read only memory) 73, CPU (microprocessor) 74, input port 75, and output port 76.

At the intake pipe 55, an air flow meter 91 is arranged for detecting the amount of flow of the air flowing through the intake passage. The output of the air flow meter 91 is input through the corresponding AD converter 77 to the input port 75.

Further, the plenum of the exhaust manifold 59, that is, at the upstream side of the catalyst 61, an air-fuel ratio sensor 92 is arranged for detecting the air-fuel ratio of the exhaust gas flowing through the inside of the exhaust manifold 59 (that is, the exhaust gas flowing into the catalyst 61). The output of the air-fuel ratio sensor 92 is input through the corresponding AD converter 77 to the input port 75.

Further, at the casing 62 holding the catalyst 61, a temperature sensor 93 is arranged for detecting the temperature of the catalyst 61 (bed temperature). The output of the temperature sensor 93 is input through the corresponding AD converter 77 to the input port 75.

Further, the vehicle mounting the internal combustion engine 10 is provided with an accelerator pedal 65. A load sensor 95 generating an output voltage proportional to the amount of depression of the accelerator pedal 65 is connected to the accelerator pedal 65. The output of the load sensor 95 is input through a corresponding AD converter 77 to the input port 75. The CPU 74 calculates the engine load based on the output of the load sensor 95.

Further, the internal combustion engine 10 is provided with a crank angle sensor 96. The crank angle sensor 96 generates an output pulse each time the crankshaft rotates by a predetermined angle (for example 15 degrees). The output of the crank angle sensor 96 is input to the input port 75. The CPU 74 calculates the engine speed based on the output of the crank angle sensor 96.

On the other hand, the output port 76 is connected through corresponding drive circuits 78 to the spark plugs 50, the fuel injectors 51, and the throttle valve driving actuator 57. The CPU 74 controls these. Specifically, the CPU 74 controls the ignition timings of the spark plugs 50, injection timings and injection amounts of fuel injected from the fuel injectors 51, and the opening degree of the throttle valve 58.

Note that, the above-mentioned internal combustion engine 10 is a non-supercharged internal combustion engine fueled with gasoline, but the configuration of the internal combustion engine is not limited to the above configuration. Therefore, the specific configuration of the internal combustion engine such as the cylinder array, injection mode of fuel, configuration of the intake and exhaust systems, configuration of the valve operation mechanism, and existence of any superchargers may differ from the configuration shown in FIG. 1. For example, the fuel injectors 51 may be configured so as to inject fuel to the inside of the intake ports 47. Further, an additional catalyst may be arranged in the exhaust passage at the downstream side of the catalyst 61.

<Exhaust Purification System of Internal Combustion Engine>

Below, the exhaust purification system of the internal combustion engine according to the first embodiment of the present invention (below, simply referred to as the "exhaust purification system") will be explained.

The exhaust purification system is provided with a catalyst 61 arranged in the exhaust passage to remove harmful substances in the exhaust gas. The catalyst 61 is a catalyst able to store oxygen, for example, a three-way catalyst. The catalyst 61 is comprised of a support made of a ceramic at which a precious metal having a catalytic action (for example, platinum (Pt)) and a co-catalyst (promoter) having an oxygen storage ability (for example, ceria ($CeO_2$)) are carried.

Figure 2:
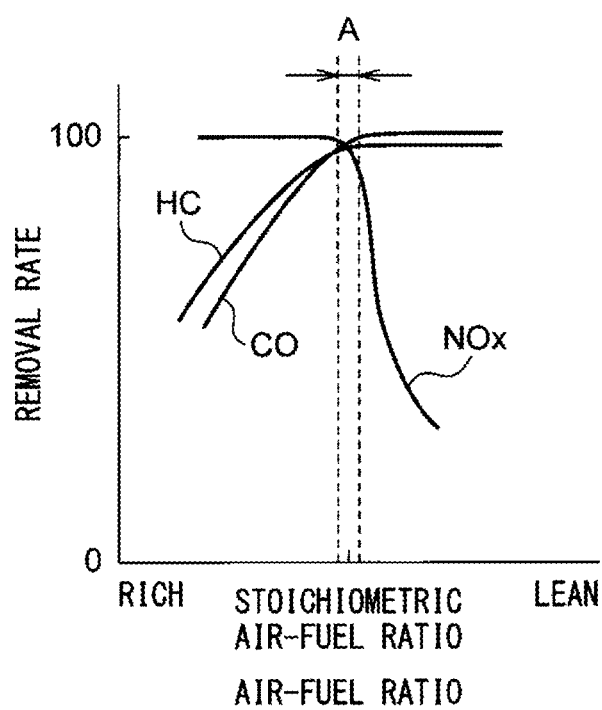
FIG. 2 shows purification characteristics of a three-way catalyst.

The catalyst 61 can simultaneously remove the hydrocarbons (HC), carbon monoxide (CO), and nitrogen oxides (NOx) in the exhaust gas. FIG. 2 shows the purification characteristics of the three-way catalyst. As shown in FIG. 2, the rates of removal of the HC, CO, and NOx by the catalyst 61 become higher when the air-fuel ratio of the exhaust gas flowing into the catalyst 61 is in the region near the stoichiometric air-fuel ratio (purification window A in FIG. 2).

Further, the catalyst 61 stores or releases oxygen by the co-catalyst in accordance with the air-fuel ratio of the exhaust gas. Specifically, the catalyst 61 stores the excess oxygen in the exhaust gas when the air-fuel ratio of the exhaust gas is leaner than the stoichiometric air-fuel ratio. On the other hand, the catalyst 61 releases the oxygen insufficient for oxidizing the HC and CO when the air-fuel ratio of the exhaust gas is richer than the stoichiometric air-fuel ratio. As a result, even when the air-fuel ratio of the exhaust gas deviates somewhat from the stoichiometric air-fuel ratio, the air-fuel ratio on the surface of the catalyst 61 is maintained near the stoichiometric air-fuel ratio and HC, CO, and NOx are effectively removed at the catalyst 61.

Therefore, the oxygen storage amount of the catalyst 61 fluctuates in accordance with the air-fuel ratio of the exhaust gas flowing into the catalyst 61. Specifically, the oxygen storage amount of the catalyst 61 increases when the air-fuel ratio of the exhaust gas flowing into the catalyst 61 is lean, while it decreases when the air-fuel ratio of the exhaust gas flowing into the catalyst 61 is rich.

If exhaust gas of an air-fuel ratio leaner than the stoichiometric air-fuel ratio flows into the catalyst 61 when the oxygen storage amount of the catalyst 61 is the maximum value, excessive oxygen is not stored in the catalyst 61 and the exhaust purification performance of the catalyst 61 with respect to the NOx falls. On the other hand, if exhaust gas of an air-fuel ratio richer than the stoichiometric air-fuel ratio flows into the catalyst 61 when the oxygen storage amount of the catalyst 61 is zero, the oxygen is insufficient for oxidation and the exhaust purification performance of the catalyst 61 with respect to the HC and CO falls. For this reason, in order to suppress the drop of the exhaust purification performance of the catalyst 61, the oxygen storage amount of the catalyst 61 is preferably maintained at a suitable value.

Therefore, in order to maintain the oxygen storage amount of the catalyst 61 at a suitable value, the oxygen amount supplied to the catalyst 61 may be changed in accordance with the oxygen storage amount of the catalyst 61. However, the exhaust purification performance of the catalyst 61 also falls due to poisoning of the catalyst 61 (rich poisoning and lean poisoning).

Rich poisoning occurs due to HC depositing on the precious metal of the catalyst 61 by exhaust gas of an air-fuel ratio richer than the stoichiometric air-fuel ratio and causes the exhaust purification performance of the catalyst 61 to fall. Rich poisoning is eliminated by supplying exhaust gas of an air-fuel ratio leaner than the stoichiometric air-fuel ratio to the catalyst 61. At this time, the oxygen supplied to the catalyst 61 is used to eliminate the rich poisoning, and thus the oxygen storage amount of the catalyst 61 is not increased much at all.

Lean poisoning occurs due to oxidation of the precious metal of the catalyst 61 by exhaust gas of an air-fuel ratio leaner than the stoichiometric air-fuel ratio and causes the exhaust purification performance of the catalyst 61 to fall. Lean poisoning is eliminated by supplying exhaust gas of an air-fuel ratio richer than the stoichiometric air-fuel ratio to the catalyst 61. At this time, the HC and CO supplied to the catalyst 61 are used to eliminate the lean poisoning, and thus the oxygen storage amount of the catalyst 61 is not decreased much at all.

For this reason, if poisoning of the catalyst 61 is not considered, the oxygen storage amount of the catalyst 61 is liable to deviate from the target value. Therefore, in the present embodiment, the oxygen amount supplied to the catalyst 61 is controlled based on the oxygen storage amount and the poisoning amount of the catalyst 61. By doing this, the oxygen storage amount of the catalyst 61 can be kept from deviating from the target value and in turn the exhaust emissions can be improved.

Figure 3:
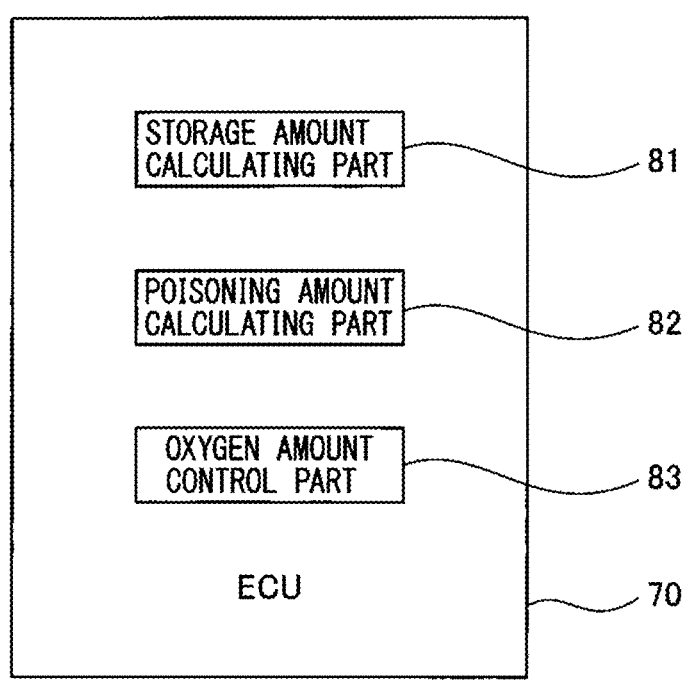
FIG. 3 is a functional block diagram of an ECU in the first embodiment.

FIG. 3 is a functional block diagram of the ECU 70 in the first embodiment. The exhaust purification system is further provided with a storage amount calculating part 81, a poisoning amount calculating part 82, and an oxygen amount control part 83. In the present embodiment, the ECU 70 has the storage amount calculating part 81, the poisoning amount calculating part 82, and the oxygen amount control part 83. The storage amount calculating part 81, the poisoning amount calculating part 82, and the oxygen amount control part 83 are functional blocks realized by programs stored in the ROM 73 of the ECU 70 being run by the CPU 74 of the ECU 70.

The storage amount calculating part 81 calculates the oxygen storage amount of the catalyst 61 (below, simply referred to as the "oxygen storage amount"). Specifically, the storage amount calculating part 81 calculates the amount of change of the oxygen storage amount and cumulatively adds this amount of change to calculate the oxygen storage amount.

The storage amount calculating part 81 calculates the amount of change of the oxygen storage amount based on the air-fuel ratio of the exhaust gas flowing into the catalyst 61 (below, referred to as the "exhaust air-fuel ratio") and the intake air amount. The change OED of the oxygen storage amount is for example calculated by the following equation (1), while the oxygen storage amount OSA is calculated by the following equation (2):

$$OED = Ks \times Ga \times (AFup - AFst)/AFup \quad (1)$$

$$OSA = \Sigma OED \quad (2)$$

Here, Ks is a storage coefficient and is predetermined considering the density of oxygen in the air, the oxygen storage efficiency of the catalyst 61, etc. Note that, the storage coefficient Ks may be set to the oxygen density in the air (0.23). Further, Ga is the intake air amount, AFup is the exhaust air-fuel ratio, and AFst is the stoichiometric air-fuel ratio (in the present embodiment, 14.6). The intake air amount Ga is detected by the air flow meter 91, while the exhaust air-fuel ratio AFup is detected by the air-fuel ratio sensor 92.

Note that, the storage amount calculating part 81 may calculate the amount of change of the oxygen storage amount based on the exhaust air-fuel ratio and fuel injection amount. In this case, the change OED of the oxygen storage amount is for example calculated by the following equation (3). The following equation (3) is calculated by entering AFup×Qi for Ga of the following equation (1).

$$OED = Ks \times Qi \times (AFup - AFst) \quad (3)$$

Here, Qi is a fuel injection amount and is calculated based on command values output from the ECU 70 to the fuel injectors 51.

The poisoning amount calculating part 82 calculates the poisoning amount of the catalyst 61 (below, simply referred to as the "poisoning amount"). Specifically, the poisoning amount calculating part 82 calculates the amount of change of the poisoning amount and cumulatively adds the amount of change to calculate the poisoning amount.

The poisoning amount calculating part 82 calculates the amount of change of the poisoning amount based on the intake air amount, exhaust air-fuel ratio, temperature of the catalyst 61, current poisoning amount, and flow velocity of the exhaust gas. The change of the poisoning amount CPA is for example calculated by the following equation (4), while the poisoning amount PA is calculated by the following equation (5):

$$CPA = Kp \times Ga \times (AFst - AFup) \quad (4)$$

$$PA = \Sigma CPA \quad (5)$$

According to the above equation (4) and equation (5), when the catalyst 61 is poisoned rich, the poisoning amount PA becomes positive, while when the catalyst 61 is poisoned lean, the poisoning amount PA becomes negative. When the poisoning amount PA is positive, the catalyst 61 is poisoned by exhaust gas richer than the stoichiometric air-fuel ratio. For this reason, the poisoning amount when the poisoning amount PA is positive, that is, the poisoning amount by exhaust gas richer than the stoichiometric air-fuel ratio, is called the "rich poisoning amount". On the other hand, when the poisoning amount PA is negative, the catalyst 61 is poisoned by exhaust gas leaner than the stoichiometric air-fuel ratio. For this reason, the poisoning amount when the poisoning amount PA is negative, that is, the poisoning amount by exhaust gas leaner than the stoichiometric air-fuel ratio, is called the "lean poisoning amount". Therefore, the poisoning amount calculating part 82 cumulatively adds the amount of change of the poisoning amount CPA to calculate the rich poisoning amount and lean poisoning amount.

In the above equation (4), Kp is a poisoning coefficient and is calculated based on the temperature of the catalyst 61, the current poisoning amount, and the flow velocity of the exhaust gas. The larger the poisoning coefficient Kp, the greater the amount of change of the poisoning amount. Further, Ga is the intake air amount, AFup is the exhaust air-fuel ratio, and AFst is the stoichiometric air-fuel ratio (in the present embodiment, 14.6). The intake air amount Ga is detected by the air flow meter 91, while the exhaust air-fuel ratio AFup is detected by the air-fuel ratio sensor 92.

Note that, the poisoning amount calculating part 82 may calculate the amount of change of the poisoning amount based on the fuel injection amount, exhaust air-fuel ratio, temperature of the catalyst 61, current poisoning amount, and flow velocity of the exhaust gas. In this case, the amount of change of the poisoning amount CPA is calculated by for example the following equation (6). The following equation (6) is calculated by entering AFup×Qi for Ga of the following equation (4):

$$CPA = Kp \times AFup \times Qi \times (AFst - AFup) \quad (6)$$

Here, Qi is the fuel injection amount and is calculated based on command values output from the ECU 70 to the fuel injectors 51.

Figure 4:
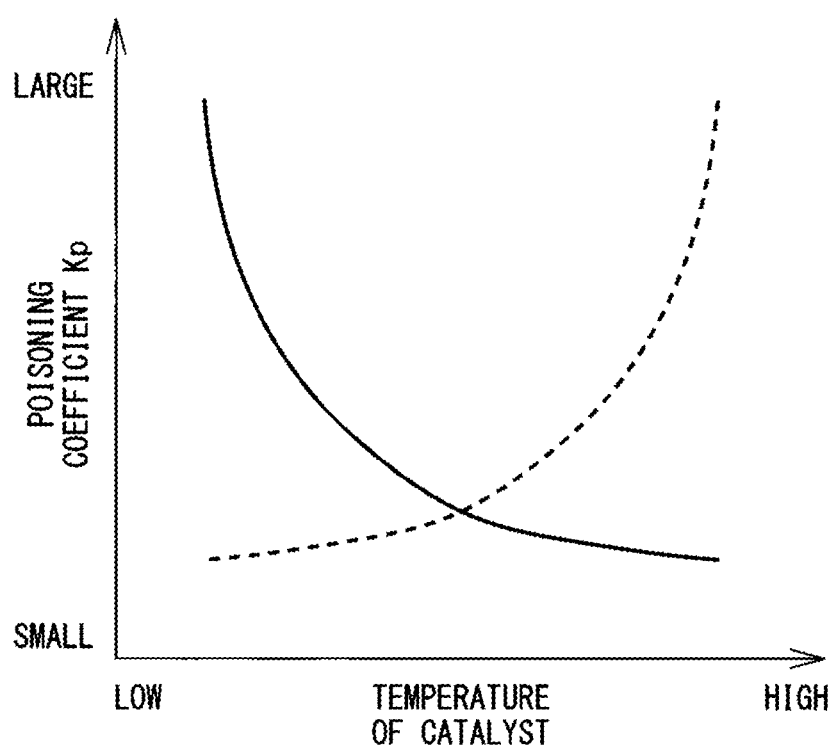
FIG. 4 is a view showing a relationship between a temperature of a catalyst and a poisoning coefficient.

FIG. 4 is a view showing a relationship between the temperature of the catalyst 61 and the poisoning coefficient Kp. The solid line in the figure shows the relationship between the temperature of the catalyst 61 and the poisoning coefficient Kp when poisoning of the catalyst 61 progresses. On the other hand, the broken line in the figure shows the relationship between the temperature of the catalyst 61 and the poisoning coefficient Kp when poisoning of the catalyst 61 is eliminated.

If the temperature of the catalyst 61 is a high temperature when rich poisoning of the catalyst 61 progresses, HC is kept from being adsorbed at the precious metal of the catalyst 61. Further, if the temperature of the catalyst 61 is a high temperature when lean poisoning of the catalyst 61 progresses, the precious metal of the catalyst 61 is kept from oxidizing.

On the other hand, if the temperature of the catalyst 61 is a high temperature when rich poisoning of the catalyst 61 is eliminated, removal of the HC on the precious metal of the catalyst 61 is promoted. Further, if the temperature of the catalyst 61 is a high temperature when lean poisoning of the catalyst 61 is eliminated, removal of the oxygen on the precious metal of the catalyst 61 is promoted.

For this reason, if poisoning of the catalyst 61 progresses, the higher the temperature of the catalyst 61, the smaller the poisoning coefficient Kp is made. On the other hand, if the poisoning of the catalyst 61 is eliminated, the higher the temperature of the catalyst 61, the poisoning coefficient Kp is made larger.

Figure 5:
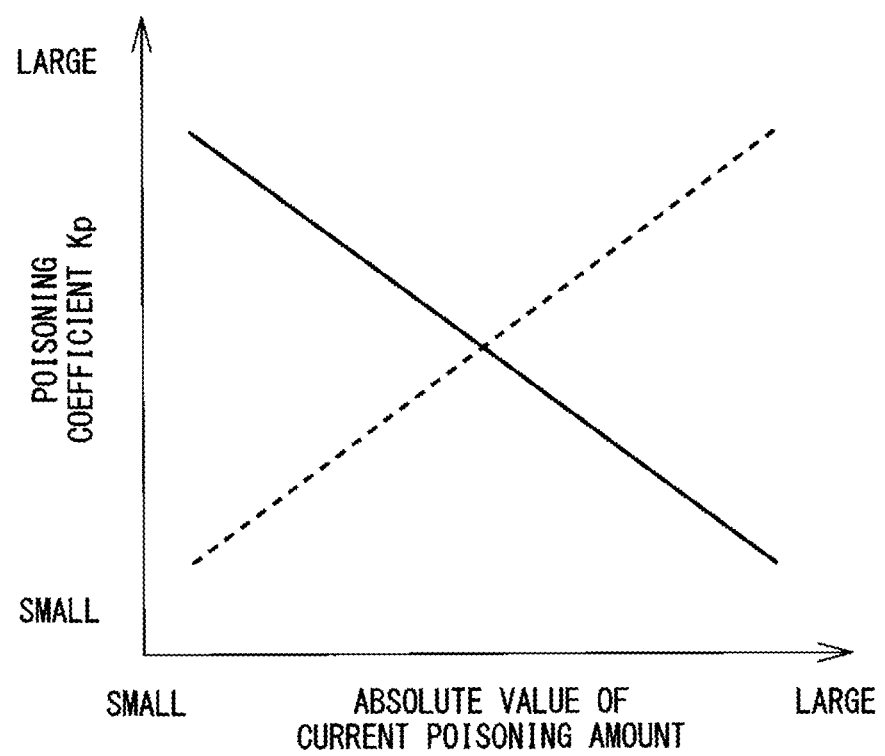
FIG. 5 is a view showing a relationship between an absolute value of a current poisoning amount and a poisoning coefficient.

FIG. 5 is a view showing the relationship of the absolute value of the current poisoning amount and the poisoning coefficient Kp. The solid line of the figure shows the relationship between the absolute value of the current poisoning amount and the poisoning coefficient Kp when poisoning of the catalyst 61 progresses. On the other hand, the broken line of the figure shows the relationship between the absolute value of the current poisoning amount and the poisoning coefficient Kp when poisoning of the catalyst 61 is eliminated.

If the absolute value of the current poisoning amount is large when the rich poisoning of the catalyst 61 progresses, the area which can be poisoned is small, and thus HC is kept from being adsorbed at the precious metal of the catalyst 61. Further, if the absolute value of the current poisoning amount is large when the lean poisoning of the catalyst 61 progresses, the area which can be poisoned is small, and thus oxidation of the precious metal of the catalyst 61 is suppressed.

On the other hand, if the absolute value of the current poisoning amount is large when the rich poisoning of the catalyst 61 is eliminated, the poisoned area is large, and thus removal of the HC on the precious metal of the catalyst 61 is promoted. Further, if the absolute value of the current poisoning amount is large when lean poisoning of the catalyst 61 is eliminated, the poisoned area is large, and thus removal of the oxygen on the precious metal of the catalyst 61 is promoted.

For this reason, if poisoning of the catalyst 61 progresses, the larger the absolute value of the current poisoning amount, the smaller the poisoning coefficient Kp is made. On the other hand, if the poisoning of the catalyst 61 is eliminated, the larger the absolute value of the current poisoning amount, the larger the poisoning coefficient Kp is made.

Figure 6:
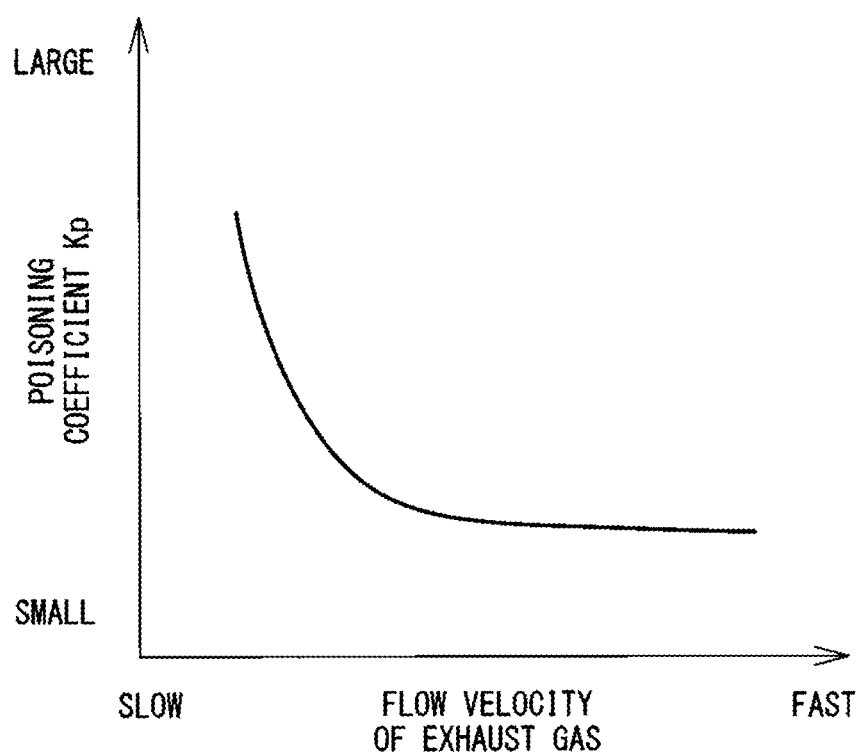
FIG. 6 is a view showing a relationship between a flow velocity of exhaust gas and a poisoning coefficient.

FIG. 6 is a view showing the relationship of the flow velocity of the exhaust gas and poisoning coefficient Kp. The solid line in the figure shows the relationship between the flow velocity of the exhaust gas and the poisoning coefficient Kp when poisoning of the catalyst 61 progresses or is eliminated.

If the flow velocity of the exhaust gas is fast when rich poisoning of the catalyst 61 progresses, the frequency of contact of the exhaust gas and the precious metal falls and HC is kept from being adsorbed at the precious metal of the catalyst 61. Further, if the flow velocity of the exhaust gas is fast when lean poisoning of the catalyst 61 progresses, the frequency of contact of the exhaust gas and the precious metal falls and the precious metal of the catalyst 61 is kept from oxidizing.

Further, if the flow velocity of the exhaust gas is fast when rich poisoning of the catalyst 61 is eliminated, the frequency of contact of the exhaust gas and the precious metal falls and HC on the precious metal of the catalyst 61 is kept from being removed. Further, if the flow velocity of the exhaust gas is fast when lean poisoning of the catalyst 61 is eliminated, the frequency of contact of the exhaust gas and the precious metal falls and the oxygen on the precious metal of the catalyst 61 is kept from being removed.

For this reason, when poisoning of the catalyst 61 progresses or is eliminated, the faster the flow velocity of the exhaust gas, the smaller the poisoning coefficient Kp is made.

Figure 7:
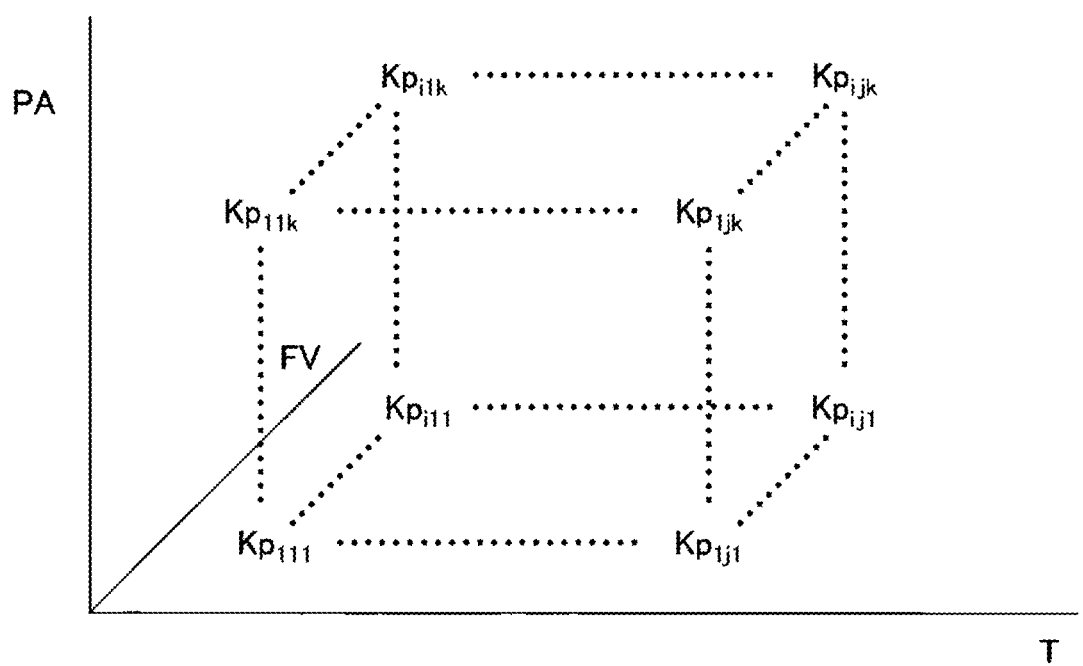
FIG. 7 is a view showing a map for calculating the poisoning coefficient based on a temperature of the catalyst, the current poisoning amount, and the flow velocity of exhaust gas.

The poisoning amount calculating part 82 uses a three-dimensional map such as shown in FIG. 7 to calculate the poisoning coefficient Kp based on the temperature T of the catalyst 61, current poisoning amount PA, and flow velocity FV of the exhaust gas. The three-dimensional map is created considering the relationship shown in FIG. 4 to FIG. 6.

As is clear from the above explanation, the value of the three-dimensional map when poisoning of the catalyst 61 progresses differs from the value of the three-dimensional map when poisoning of the catalyst 61 is eliminated. Note that, the value of the three-dimensional map when the catalyst 61 is poisoned rich may differ from the value of the three-dimensional map when the catalyst 61 is poisoned lean. In this case, a total of four three-dimensional maps are used. Further, the poisoning amount calculating part 82 may use a calculation formula to calculate the poisoning coefficient Kp based on the temperature T of the catalyst 61, the current poisoning amount PA, and the flow velocity FV of exhaust gas.

The oxygen amount control part 83 controls the oxygen amount supplied to the catalyst 61 (below, referred to the "amount of supply of oxygen to the catalyst 61") based on the oxygen storage amount and the poisoning amount of the catalyst 61. For example, the leaner the air-fuel ratio of the air-fuel mixture supplied to the combustion chambers 45 of the internal combustion engine 10, the greater the amount of supply of oxygen to the catalyst 61. For this reason, in the present embodiment, the oxygen amount control part 83 controls the amount of supply of oxygen to the catalyst 61 by changing the air-fuel ratio of the air-fuel mixture supplied to the combustion chambers 45 of the internal combustion engine 10.

<Processing for Calculating Oxygen Storage Amount>

Figure 8:
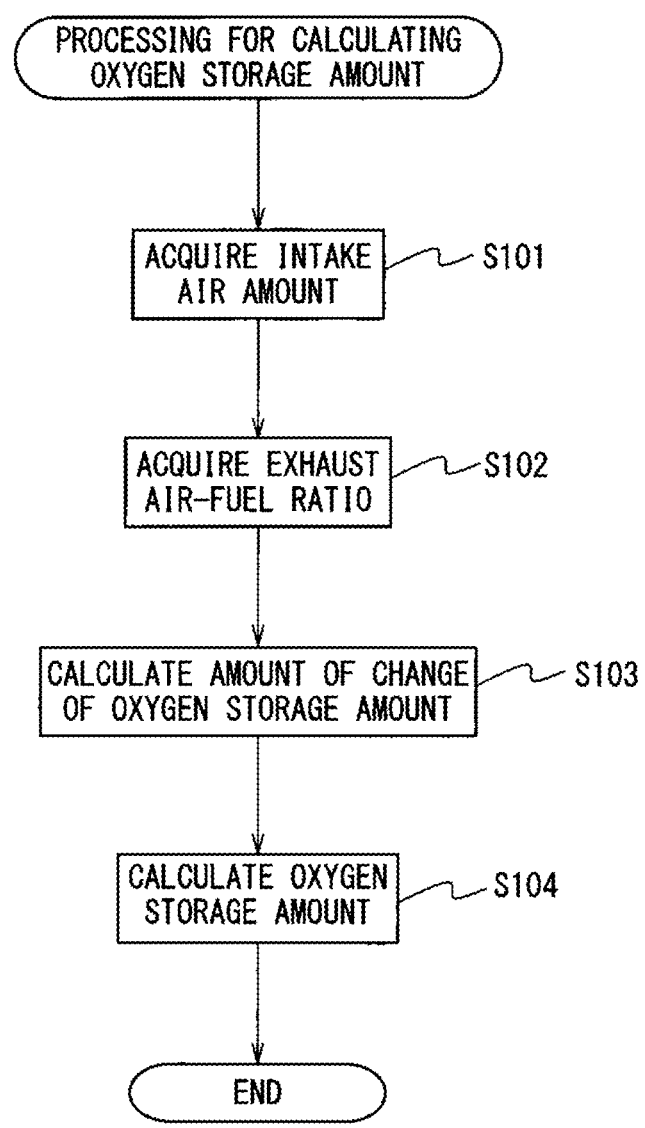
FIG. 8 is a flow chart showing a control routine of processing for calculating the oxygen storage amount in the first embodiment of the present invention.

Below, referring to the flow chart of FIG. 8, control for calculating the oxygen storage amount of the catalyst 61 will be explained in detail. FIG. 8 is a flow chart showing the control routine of processing for calculating the oxygen storage amount in the first embodiment of the present invention. The present control routine is repeatedly performed by the ECU 70 at predetermined time intervals.

First, at step S101, the storage amount calculating part 81 acquires the intake air amount detected by the air flow meter 91. Next, at step S102, the storage amount calculating part 81 acquires the exhaust air-fuel ratio detected by the air-fuel ratio sensor 92.

Next, at step S103, the storage amount calculating part 81 calculates the amount of change of the oxygen storage amount. Specifically, the storage amount calculating part 81 calculates the amount of change of the oxygen storage amount by the above equation (1) based on the intake air amount and exhaust air-fuel ratio. The amount of change of the oxygen storage amount becomes positive if the exhaust air-fuel ratio is leaner than the stoichiometric air-fuel ratio, while it becomes negative if the exhaust air-fuel ratio is richer than the stoichiometric air-fuel ratio.

Next, at step S104, the storage amount calculating part 81 calculates the oxygen storage amount. Specifically, the storage amount calculating part 81 adds the amount of change of the oxygen storage amount to the current oxygen storage amount to thereby update the oxygen storage amount. Note that, the initial value of the oxygen storage amount is set to a predetermined value (for example zero). Further, the upper limit value of the oxygen storage amount is set to a predetermined maximum oxygen storage amount, while the lower limit value of the oxygen storage amount is set to zero. After step S104, the present control routine ends.

Note that, at step S101, the storage amount calculating part 81 may calculate the fuel injection amounts based on the command values output from the ECU 70 to the fuel injectors 51. In this case, at step S103, the storage amount calculating part 81 calculates the amount of change of the oxygen storage amount by the above equation (3).

Further, when the downstream side air-fuel ratio sensor is arranged at the downstream side of the catalyst 61 and the air-fuel ratio detected by the downstream side air-fuel ratio sensor falls to a rich judged air-fuel ratio richer than the stoichiometric air-fuel ratio (for example 14.55), the oxygen storage amount of the catalyst 61 may be reset to zero. Further, when the air-fuel ratio detected by the downstream side air-fuel ratio sensor rises to a lean judged air-fuel ratio leaner than the stoichiometric air-fuel ratio (for example 14.65), the oxygen storage amount of the catalyst 61 may be set to the maximum oxygen storage amount.

<Processing for Calculation of Amount of Poisoning>

Figure 9:
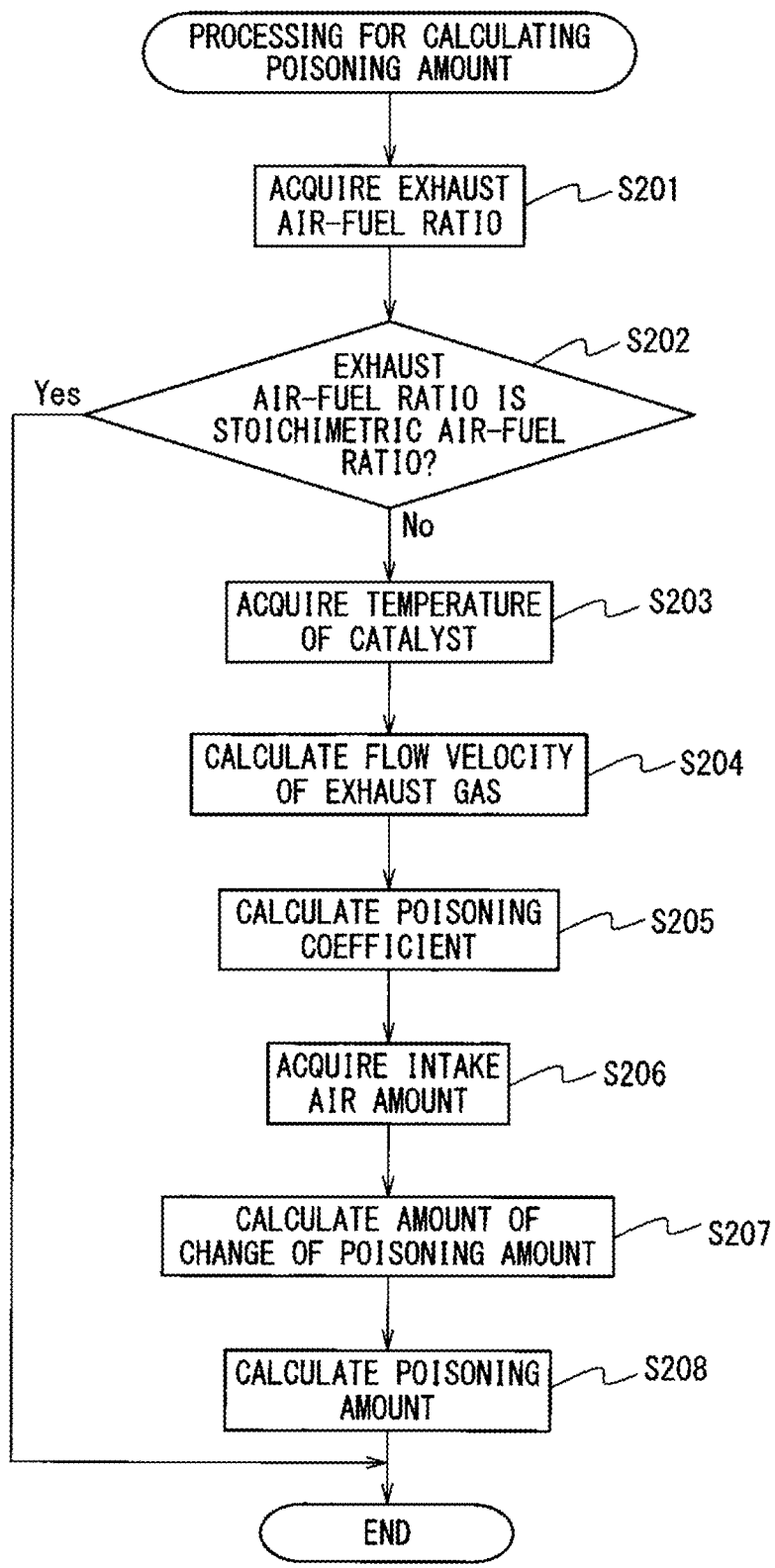
FIG. 9 is a flow chart showing a control routine of processing for calculating the poisoning amount in the first embodiment of the present invention.

Below, referring to the flow chart of FIG. 9, control for calculation of the amount of poisoning of the catalyst 61 will be explained. FIG. 9 is a flow chart showing the control routine of the processing for calculation of the amount of poisoning in the first embodiment of the present invention. The present control routine is repeatedly performed by the ECU 70 at predetermined time intervals.

First, at step S201, the poisoning amount calculating part 82 acquires the exhaust air-fuel ratio detected by the air-fuel ratio sensor 92. Next, at step S202, the poisoning amount calculating part 82 judges whether the exhaust air-fuel ratio is the stoichiometric air-fuel ratio. If it is judged that the exhaust air-fuel ratio is the stoichiometric air-fuel ratio, the amount of change of the poisoning amount becomes zero, so the present control routine ends. That is, the poisoning amount is maintained at the current value.

On the other hand, if, at step S202, it is judged that the exhaust air-fuel ratio is richer or leaner than the stoichiometric air-fuel ratio, the present control routine proceeds to step S203. At step S203, the poisoning amount calculating part 82 acquires the temperature of the catalyst 61 detected by the temperature sensor 93.

Note that, the temperature sensor 93 may be arranged at the upstream side or downstream side of the catalyst 61, and the poisoning amount calculating part 82 may calculate the temperature of the catalyst 61 based on the temperature of the exhaust gas detected by the temperature sensor 93. Further, the poisoning amount calculating part 82 may calculate the temperature of the catalyst 61 based on a predetermined status quantity of the internal combustion engine 10 (for example, amount of intake air, engine load, etc.) without using the temperature sensor 93.

Next, at step S204, the poisoning amount calculating part 82 calculates the flow velocity of the exhaust gas based on the predetermined status quantity of the internal combustion engine 10. For example, basically, the greater the intake air amount, the faster the flow velocity of the exhaust gas, so the poisoning amount calculating part 82 calculates the flow velocity of the exhaust gas based on the intake air amount. Note that, the poisoning amount calculating part 82 may calculate the flow velocity of the exhaust gas based on other status quantities of the internal combustion engine 10 (for example, the engine load and engine speed).

Next, at step S205, the poisoning amount calculating part 82 uses a three-dimensional map such as shown in FIG. 7 to calculate the poisoning coefficient Kp based on the temperature T of the catalyst 61, current poisoning amount PA, and flow velocity of the exhaust gas. The current poisoning amount PA is, for example, stored in the RAM 72 of the ECU 70.

If the current poisoning amount PA is positive and the exhaust air-fuel ratio is richer than the stoichiometric air-fuel ratio, rich poisoning progresses. Further, if the current poisoning amount PA is negative and the exhaust air-fuel ratio is leaner than the stoichiometric air-fuel ratio, lean poisoning progresses. For this reason, in these cases, for calculating the poisoning coefficient Kp, the first map in the case where poisoning of the catalyst 61 progresses is used.

On the other hand, if the current poisoning amount PA is positive and the exhaust air-fuel ratio is leaner than the stoichiometric air-fuel ratio, the rich poisoning is eliminated. Further, if the current poisoning amount PA is negative and the exhaust air-fuel ratio is richer than the stoichiometric air-fuel ratio, the lean poisoning is eliminated. For this reason, in these cases, to calculate the poisoning coefficient Kp, the second map in the case where poisoning of the catalyst 61 is eliminated is used.

Next, at step S206, the poisoning amount calculating part 82 acquires the intake air amount detected by the air flow meter 91. Next, at step S207, the poisoning amount calculating part 82 calculates the amount of change of the poisoning amount by the above equation (4) based on the poisoning coefficient, exhaust air-fuel ratio, and intake air amount. The amount of change of the poisoning amount becomes positive when the exhaust air-fuel ratio is richer than the stoichiometric air-fuel ratio and becomes negative when the exhaust air-fuel ratio is leaner than the stoichiometric air-fuel ratio.

Next, at step S208, the poisoning amount calculating part 82 calculates the poisoning amount. Specifically, the poisoning amount calculating part 82 adds the amount of change of the poisoning amount to the current poisoning amount to update the poisoning amount. Note that, the initial value of the poisoning amount is set to a predetermined value (for example zero). After step S208, the present control routine ends.

Note that, at step S206, the poisoning amount calculating part 82 may calculate the fuel injection amount based on the command values output from the ECU 70 to the fuel injectors 51. In this case, at step S207, the poisoning amount calculating part 82 calculates the amount of change of the poisoning amount by the above equation (6). Further, the poisoning amount calculating part 82 may calculate the poisoning coefficient based on at least one of the temperature of the catalyst 61, current poisoning amount, and flow velocity of the exhaust gas.

<Processing for Supply of Oxygen>

Figure 10:
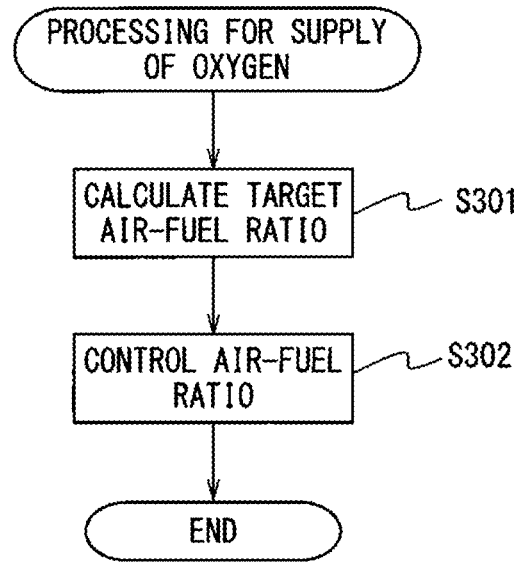
FIG. 10 is a flow chart showing a control routine of processing for supply of oxygen in the first embodiment of the present invention.

Below, referring to the flow chart of FIG. 10, control for supplying oxygen to the catalyst 61 will be explained. FIG. 10 is a flow chart showing the control routine of the processing for supply of oxygen in the first embodiment of the present invention. The present control routine is repeatedly performed by the ECU 70 at predetermined time intervals.

First, at step S301, the oxygen amount control part 83 calculates the target air-fuel ratio of the exhaust gas flowing into the catalyst 61 based on the oxygen storage amount calculated at the control routine of FIG. 8 and the poisoning amount calculated at the control routine of FIG. 9. For example, the oxygen amount control part 83 calculates the target air-fuel ratio before correction based on the oxygen storage amount, calculates the correction amount of target air-fuel ratio based on the poisoning amount, and adds a correction amount to the target air-fuel ratio before correction to calculate the target air-fuel ratio.

Figure 11:
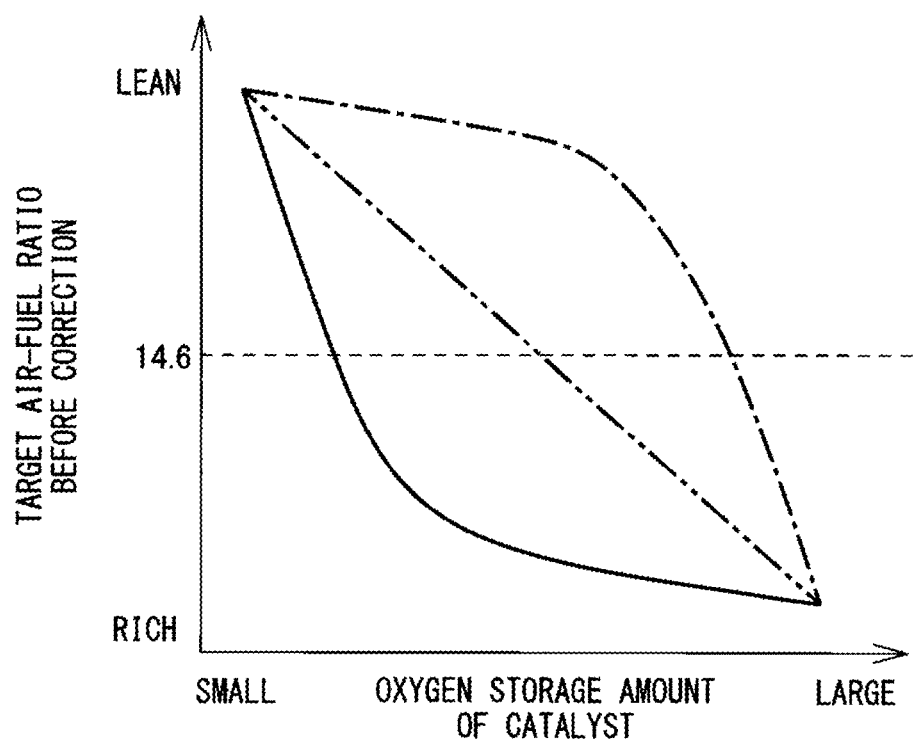
FIG. 11 is a view showing a relationship of the oxygen storage amount and a target air-fuel ratio before correction.

FIG. 11 is a view showing the relationship between the oxygen storage amount and the target air-fuel ratio before correction. The smaller the oxygen storage amount, the greater the amount of oxygen has to be supplied to the catalyst 61. For this reason, the target air-fuel ratio before correction is made leaner the smaller the oxygen storage amount. Examples of the relationship between the oxygen storage amount and the target air-fuel ratio before correction are shown by a solid line, one-dot chain line, and two-dot chain line in FIG. 11.

Figure 12:
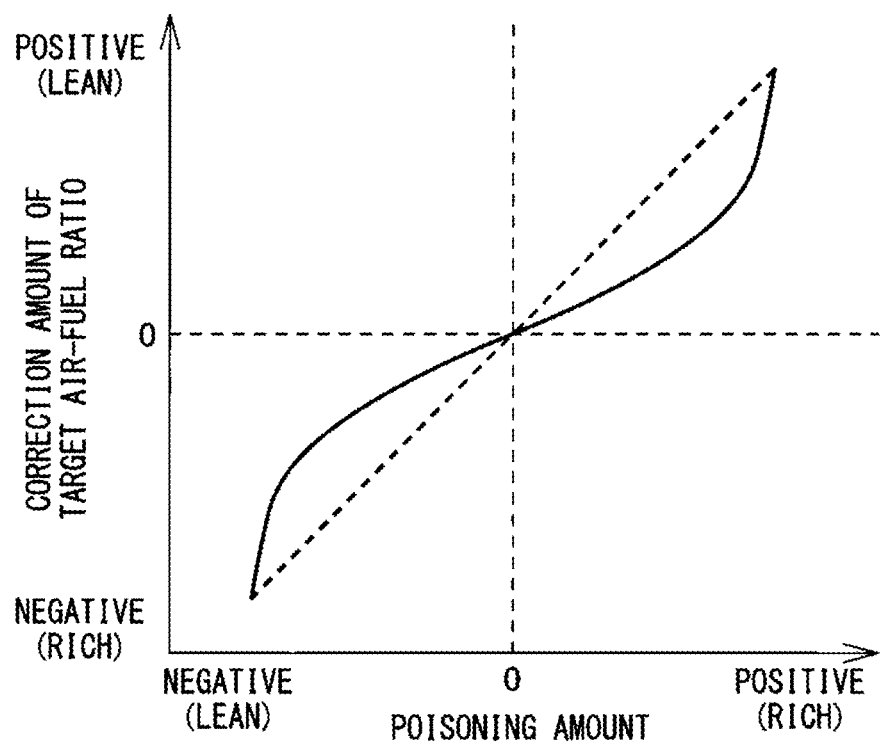
FIG. 12 is a view showing a relationship between the poisoning amount and the correction amount of a target air-fuel ratio.

FIG. 12 is a view showing the relationship between the poisoning amount and the correction amount of the target air-fuel ratio. If the poisoning amount is positive, that is, if the catalyst 61 is poisoned rich, the oxygen supplied to the catalyst 61 is used for eliminating the poisoning. For this reason, in order to realize the desired oxygen storage amount, a greater amount of oxygen has to be supplied to the catalyst 61. Considering this, if the poisoning amount is positive, the correction amount of the target air-fuel ratio is set to a positive value. As a result, the target air-fuel ratio before correction is corrected to the lean side.

On the other hand, if the poisoning amount is negative, that is, if the catalyst 61 is poisoned lean, the HC and CO supplied to the catalyst 61 are used for eliminating the poisoning and oxygen stored in the catalyst 61 is not consumed for removal of HC and CO. For this reason, it can be deemed that the catalyst 61 is storing greater oxygen than the actual oxygen storage amount. Considering this, if the poisoning amount is negative, the correction amount of the target air-fuel ratio is set to a negative value. As a result, the target air-fuel ratio before correction is corrected to the rich side. Examples of the relationship between the poisoning amount and the correction amount of the target air-fuel ratio are shown by the solid line and broken line in FIG. 12.

The oxygen amount control part 83 uses a map such as shown in FIG. 11 to calculate the target air-fuel ratio before correction based on the oxygen storage amount and uses a map such as shown in FIG. 12 to calculate the correction amount of target air-fuel ratio based on the poisoning amount.

Figure 13:
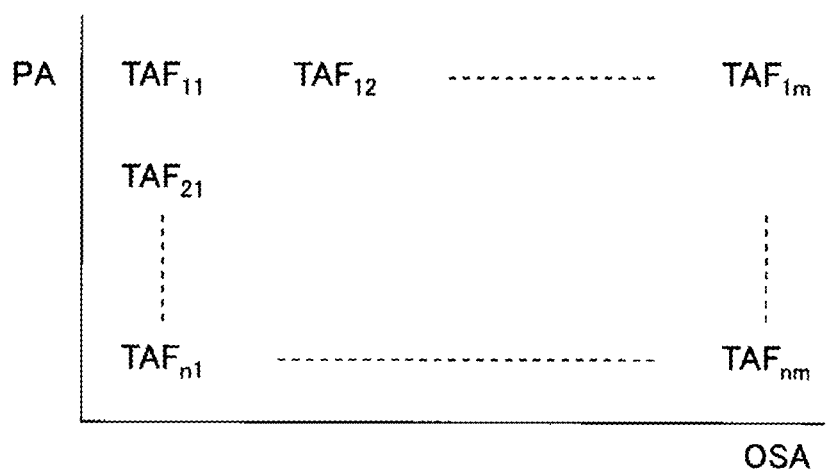
FIG. 13 is a view showing a map for calculating the target air-fuel ratio based on the oxygen storage amount and the poisoning amount.

Note that, the oxygen amount control part 83 may use a two-dimensional map such as shown in FIG. 13 to calculate the target air-fuel ratio TAF based on the oxygen storage amount OSA and the poisoning amount PA. With this map, if the poisoning amount PA is constant, the smaller the oxygen storage amount OSA, the leaner the target air-fuel ratio TAF is made. Further, if the oxygen storage amount OSA is constant, the larger the value of the poisoning amount PA, the leaner the target air-fuel ratio TAF is made.

Next, at step S302, the oxygen amount control part 83 performs air-fuel ratio control. Specifically, the oxygen amount control part 83 controls the amount of fuel fed from the fuel injectors 51 to the combustion chambers 45 so that the exhaust air-fuel ratio matches the target air-fuel ratio. In the present embodiment, the oxygen amount control part 83 controls by feedback the amount of fuel fed from the fuel injectors 51 to the combustion chambers 45 so that the air-fuel ratio detected by the air-fuel ratio sensor 92 matches the target air-fuel ratio. After step S302, the present control routine ends.

Note that, the present control routine may be performed only when a predetermined condition is satisfied. The predetermined condition is, for example, the oxygen storage amount calculated by the storage amount calculating part 81 being outside a predetermined range, the absolute value of the poisoning amount calculated by the poisoning amount calculating part 82 being equal to or more than a predetermined value, etc.

Second Embodiment

An exhaust purification system according to a second embodiment is basically similar to the exhaust purification system according to the first embodiment except for the points explained below. For this reason, below, the second embodiment of the present invention will be explained focusing on parts different from the first embodiment.

Figure 14:
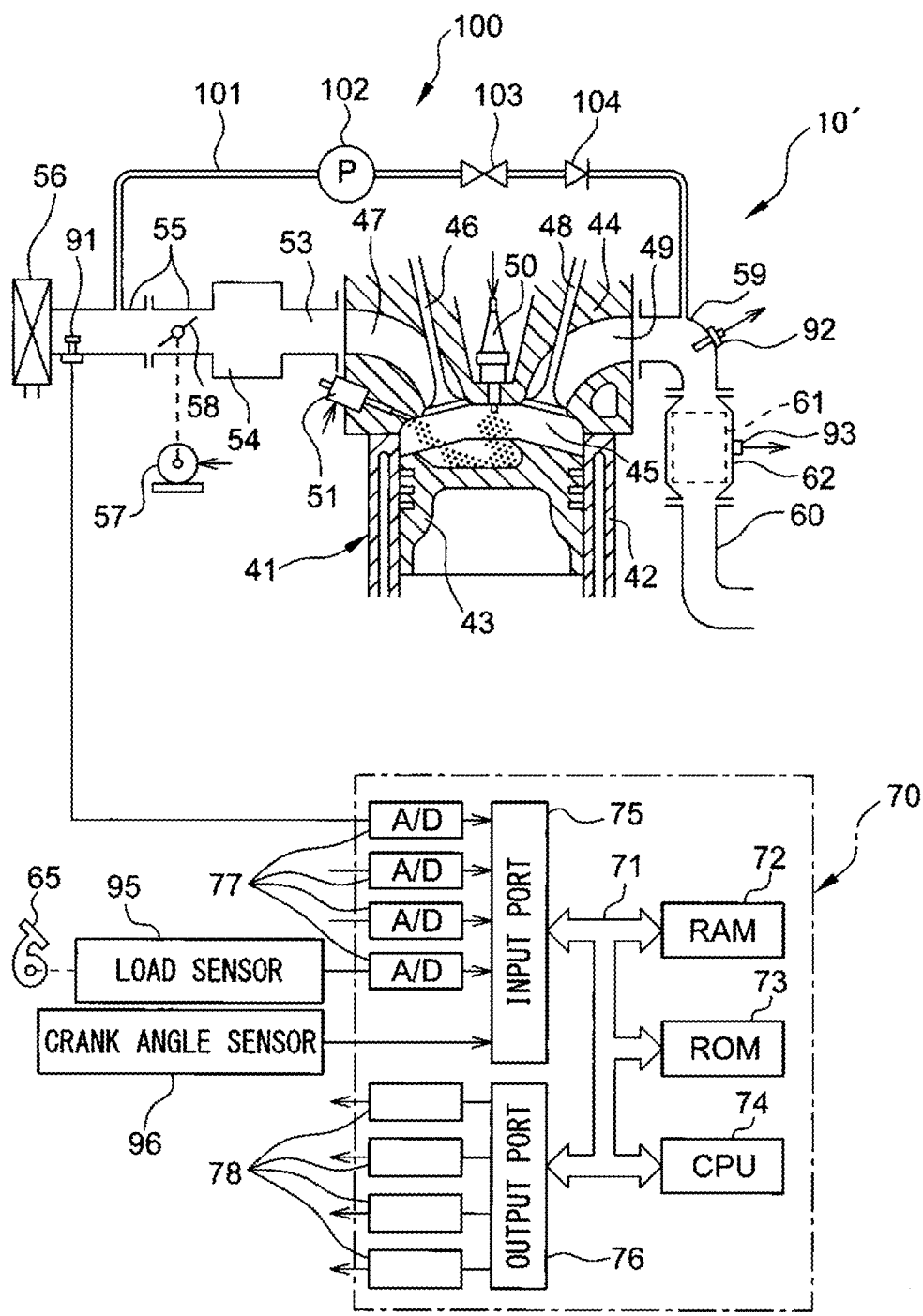
FIG. 14 is a view schematically showing an internal combustion engine to which an exhaust purification system of an internal combustion engine according to a second embodiment of the present invention is applied.

FIG. 14 is a view schematically showing an internal combustion engine to which an exhaust purification system of an internal combustion engine according to the second embodiment of the present invention is applied. In the second embodiment, the internal combustion engine 10' and exhaust purification system are further provided with an air feed device 100 directly supplying air to the exhaust passage at the upstream side from the catalyst 61.

The air feed device 100 includes an air feed passage 101, air pump 102, air switching valve 103, and check valve 104. The air pump 102, air switching valve 103, and check valve 104 are arranged in the air feed passage 101.

The air feed passage 101 connects the intake passage at the upstream side from the throttle valve 58 and the exhaust passage at the upstream side from the catalyst 61. Specifically, the air feed passage 101 connects the intake pipe 55 and the exhaust manifold 59. The air pump 102 is driven by an electric motor, pressurizes air inside the intake passage, and supplies it to exhaust manifold 59. The air switching valve 103 opens and closes the air feed passage 101. The check valve 104 prevents backflow of air from the exhaust passage to the intake passage.

The air pump 102 and air switching valve 103 are electrically connected to the ECU 70 and controlled by the ECU 70. When air is supplied by the air feed device 100 to the exhaust passage, the air switching valve 103 is opened and the air pump 102 is driven. As a result, a part of the air passing through the air cleaner 56 passes through the air feed passage 101 to be supplied to the exhaust passage. The air feed device 100 is a so-called secondary air feed device. Note that, the source of supply of air may be something other than the intake passage.

In the second embodiment, the oxygen amount control part 83 supplies air from the air feed device 100 to the exhaust passage to thereby supply oxygen to the catalyst 61. The greater the air amount supplied from the air feed device 100 to the exhaust passage, the greater the amount of supply of oxygen to the catalyst 61. For this reason, the oxygen amount control part 83 controls the amount of supply of oxygen to the catalyst 61 by changing the air amount supplied from the air feed device 100 to the exhaust passage. In this case, it is not necessary to change the air-fuel ratio of the air-fuel mixture for controlling the amount of supply of oxygen to the catalyst 61, so it is possible to set the air-fuel ratio of the air-fuel mixture to a desired value corresponding to the operating state of the internal combustion engine 10'.

<Processing for Supply of Oxygen>

Figure 15:
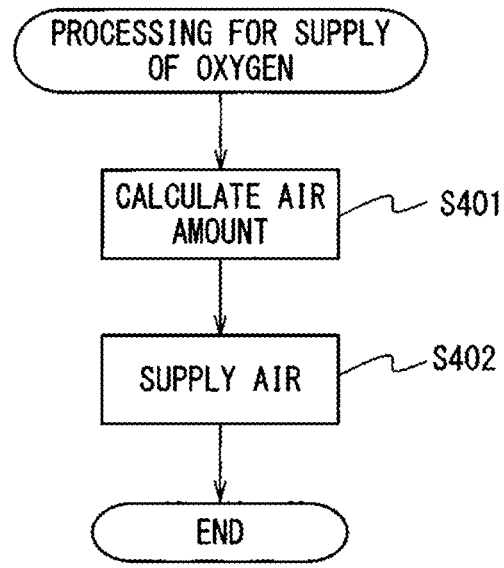
FIG. 15 is a flow chart showing the control routine of processing for supply of oxygen in the second embodiment of the present invention.

FIG. 15 is a flow chart showing the control routine of the processing for supply of oxygen in the second embodiment of the present invention. The present control routine is repeatedly performed by the ECU 70 at predetermined time intervals.

First, at step S401, the oxygen amount control part 83 uses the air feed device 100 to calculate the air amount to be supplied to the catalyst 61 based on the oxygen storage amount calculated at the control routine of FIG. 8 and the poisoning amount calculated at the control routine of FIG. 9. For example, the oxygen amount control part 83 calculates the air amount before correction based on the oxygen storage amount, calculates the correction amount of the air amount based on the poisoning amount, and adds the correction amount to the air amount before correction to calculate the air amount.

Figure 16:
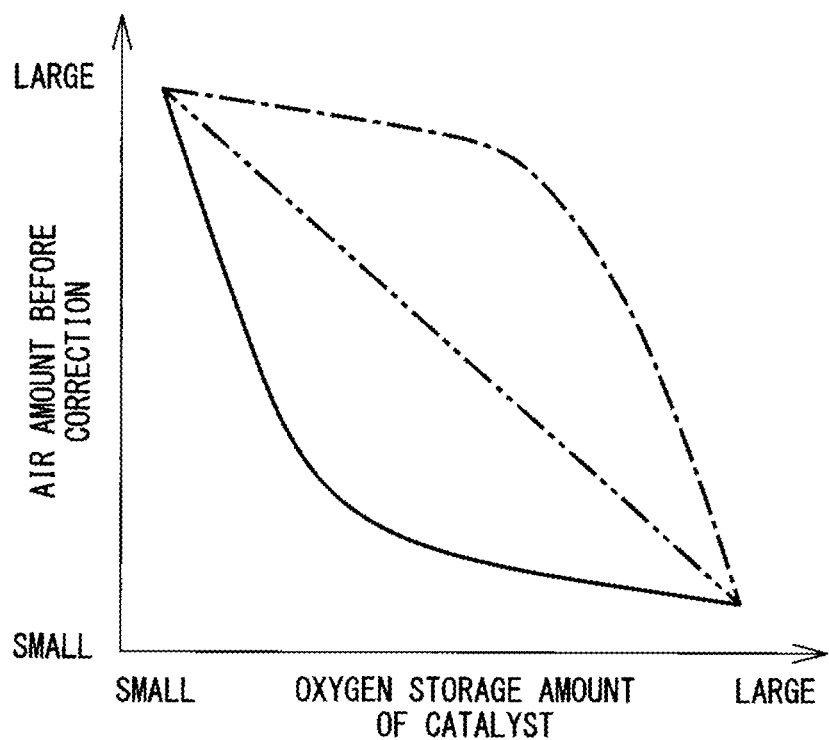
FIG. 16 is a view showing a relationship between an oxygen storage amount and air amount before correction.

FIG. 16 is a view showing the relationship between the oxygen storage amount and the air amount before correction. The smaller the oxygen storage amount, the greater the amount of oxygen that has to be supplied to the catalyst 61. For this reason, the air amount before correction is made greater the smaller the oxygen storage amount. The examples of the relationship of the oxygen storage amount and the air amount before correction are shown by the solid line, one-dot chain line, and two-dot chain line in FIG. 16.

Note that, the air amount before correction when the oxygen storage amount is equal to or more than a predetermined value may be set to zero.

Figure 17:
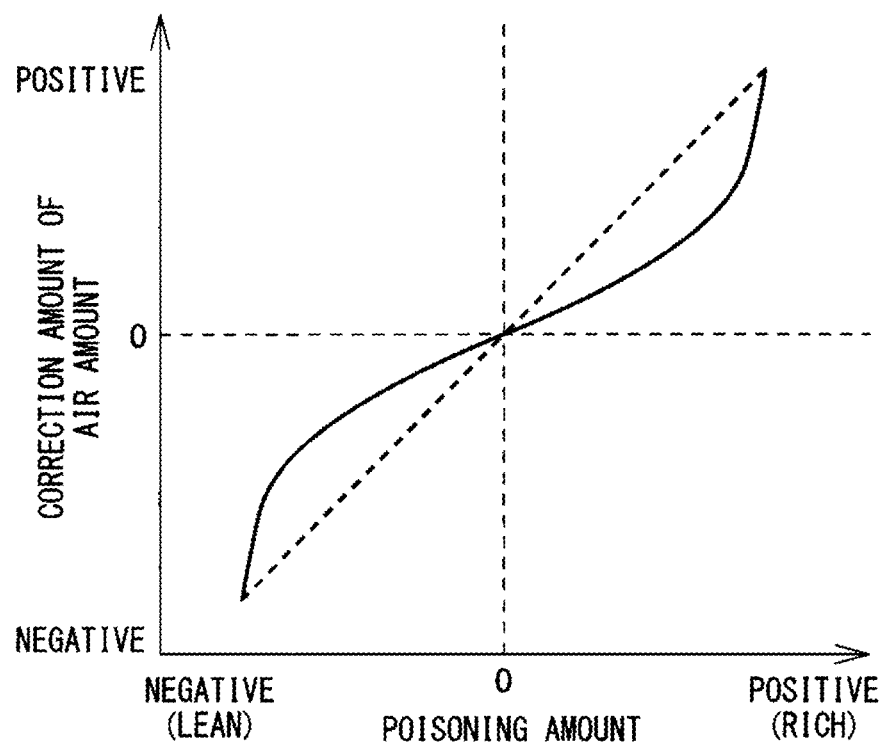
FIG. 17 is a view showing a relationship between a poisoning amount and correction amount of an air amount.

FIG. 17 is a view showing the relationship between the poisoning amount and the correction amount of the air amount. When the poisoning amount is positive, that is, if the catalyst 61 is poisoned rich, the oxygen supplied to the catalyst 61 is used for elimination of poisoning. For this reason, in order to realize the desired oxygen storage amount, a greater amount of oxygen has to be supplied to the catalyst 61. Considering this, if the poisoning amount is positive, the correction amount of the air amount is set to a positive value. As a result, the air amount before correction is made greater by the correction.

On the other hand, if the poisoning amount is negative, that is, if the catalyst 61 is poisoned lean, the HC and CO supplied to the catalyst 61 are used for elimination of poisoning. The oxygen stored in the catalyst 61 is not consumed for removing the HC and CO. For this reason, it may be deemed that the catalyst 61 stores a greater amount of oxygen than the actual oxygen storage amount. Considering this, when the poisoning amount is negative, the correction amount of the air amount is set to a negative value. As a result, the air amount before correction is made smaller by the correction. Examples of the relationship between the poisoning amount and the correction amount of the air amount are shown by the solid line and broken line in FIG. 17.

The oxygen amount control part 83 uses a map such as shown in FIG. 16 to calculate the air amount before correction based on the oxygen storage amount and uses a map such as shown in FIG. 17 to calculate a correction amount of the air amount based on the poisoning amount.

Figure 18:
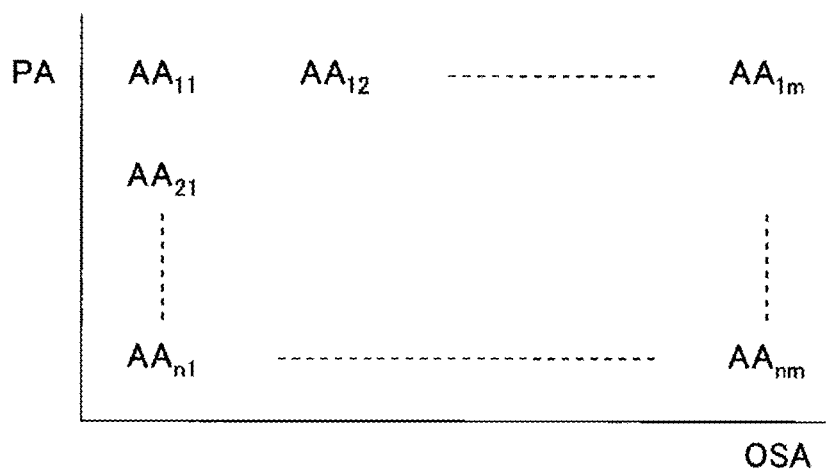
FIG. 18 is a view showing a map for calculating an air amount based on the oxygen storage amount and the poisoning amount.

Note that, the oxygen amount control part 83 may use a two-dimensional map such as shown in FIG. 18 to calculate the air amount AA based on the oxygen storage amount OSA and the poisoning amount PA. In this map, when the poisoning amount PA is constant, the smaller the oxygen storage amount OSA, the greater the air amount AA is made. Further, when the oxygen storage amount OSA is constant, the larger the value of the poisoning amount PA, the greater the air amount AA.

Next, at step S402, the oxygen amount control part 83 supplies air from the air feed device 100 to the exhaust passage so that the air amount calculated at step S401 is supplied to the exhaust passage. For example, the oxygen amount control part 83 opens the air switching valve 103 of the air feed device 100 for a time corresponding to the air amount calculated at step S401. After step S402, the present control routine ends.

Note that, the present control routine may be performed only when a predetermined condition is satisfied. The predetermined condition is, for example, the oxygen storage amount calculated by the storage amount calculating part 81 being outside a predetermined range, the absolute value of the amount of poisoning calculated by the poisoning amount calculating part 82 being equal to or more than a predetermined value, etc.

Third Embodiment

An exhaust purification system according to a third embodiment is basically similar to the exhaust purification system according to the second embodiment except for the points explained below. For this reason, below, the third embodiment of the present invention will be explained focusing on parts different from the second embodiment.

Figure 19:
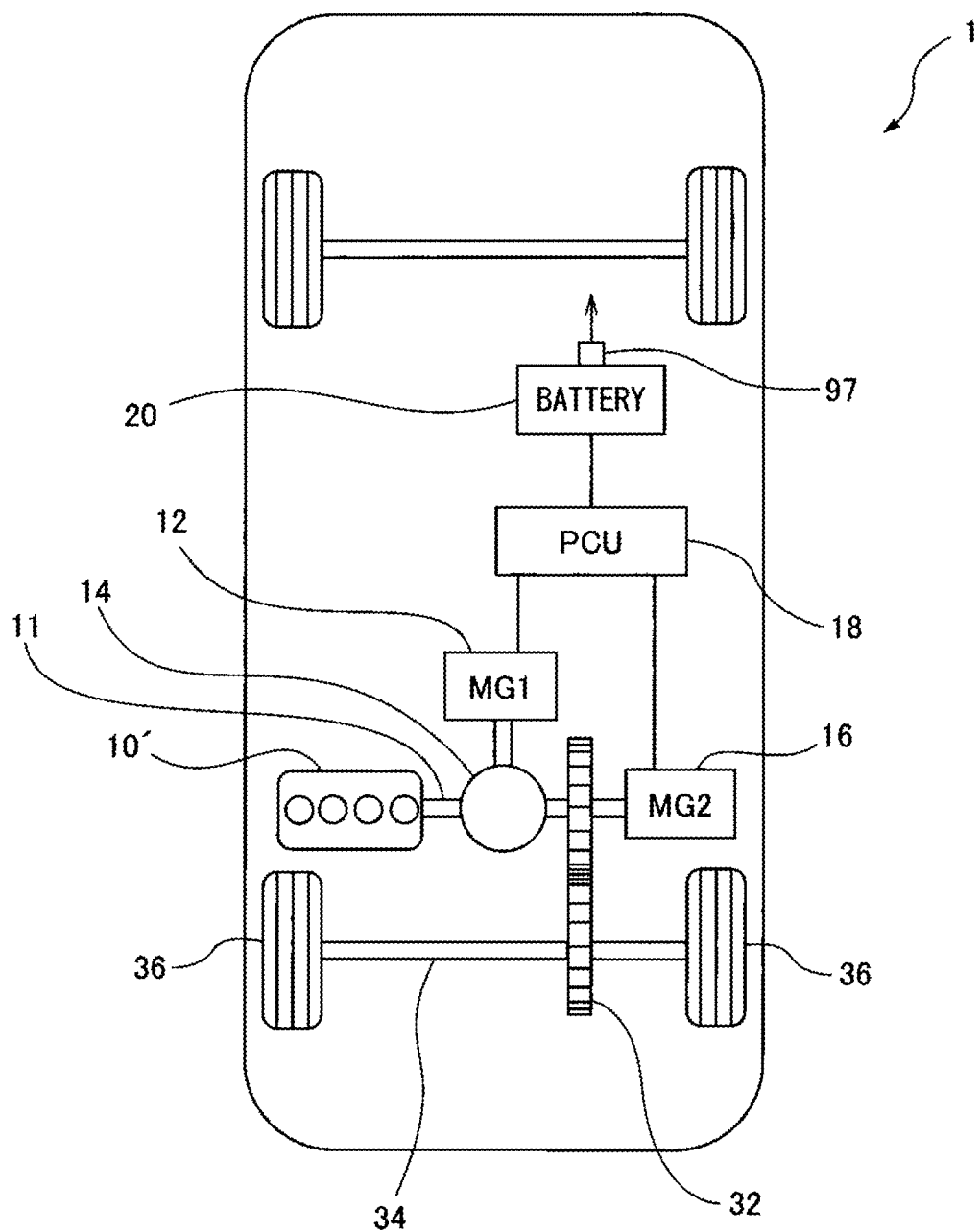
FIG. 19 is a view schematically showing a vehicle mounting an exhaust purification system of an internal combustion engine according to a third embodiment of the present invention.

FIG. 19 is a view schematically showing a vehicle mounting an exhaust purification system of an internal combustion engine according to the third embodiment of the present invention. The vehicle 1 is provided with an internal combustion engine 10', first motor-generator 12, power distribution mechanism 14, second motor-generator 16, power control unit (PCU) 18, and battery 20.

The vehicle 1 is provided with an internal combustion engine 10' and a second motor-generator 16 as sources of power for driving. That is, the vehicle 1 is a so-called hybrid vehicle. The configuration of the hybrid vehicle is known, so below the functions of the parts will be briefly explained.

The output shaft (crankshaft 11) of the internal combustion engine 10' is mechanically connected to the power distribution mechanism 14. The output of the internal combustion engine 10' is input to the power distribution mechanism 14. When the first motor-generator 12 functions as a generator, the output of the internal combustion engine 10' is distributed through the power distribution mechanism 14 to the first motor-generator 12 and speed reducer 32. The output of the internal combustion engine 10' distributed to the first motor-generator 12 is used by the first motor-generator 12 to generate electric power. On the other hand, the output of the internal combustion engine 10' distributed to the speed reducer 32 is transmitted as power for driving through an axle 34 to the wheels 36.

The first motor-generator 12 is mechanically connected to the crankshaft 11 of the internal combustion engine 10' through the power distribution mechanism 14. When the first motor-generator 12 functions as a motor, the electric power stored in the battery 20 is supplied through the PCU 18 to the first motor-generator 12. The output of the first motor-generator 12 is supplied through the power distribution mechanism 14 to the crankshaft 11 of the internal combustion engine 10'. As a result, the crankshaft 11 is driven to rotate without the air-fuel mixture being burned in the combustion chambers 45 and so-called motoring is performed. Motoring is used to start up the internal combustion engine 10'.

When the second motor-generator 16 functions as a motor, the electric power stored in the battery 20 or electric power generated by the first motor-generator 12 is supplied through the PCU 18 to the second motor-generator 16 and the output of the second motor-generator 16 is supplied to the speed reducer 32. The output of the second motor-generator 16 supplied to the speed reducer 32 is transmitted as power for driving through the axle 34 to the wheels 36.

On the other hand, at the time of speed reduction of the vehicle, the second motor-generator 16 is driven by rotation of the wheels 36 and the second motor-generator 16 functions as a generator. The regenerated electric power generated by the second motor-generator 16 is supplied through the PCU 18 to the battery 20.

Further, the voltage sensor 97 detecting the voltage across electrodes of the battery 20 is provided at the battery 20. The output of the voltage sensor 97 is input through the corresponding AD converter 77 to the input port 75.

Note that, the first motor-generator 12 may be a motor not functioning as a generator. Further, the second motor-generator 16 may be a motor not functioning as a generator. Further, the vehicle 1 may be a plug-in hybrid vehicle able to use an external power supply to charge the battery 20. Further, the vehicle 1 shown in FIG. 19 is a so-called series parallel type hybrid vehicle, but the vehicle 1 may be another type of hybrid vehicle such as a series type or parallel type.

In the third embodiment, the oxygen amount control part 83 supplies oxygen to the catalyst 61 when the air-fuel mixture is not being burned in the combustion chambers 45 of the internal combustion engine 10'. By doing this, the oxygen storage amount of the catalyst 61 may be set to a suitable value in advance before the air-fuel mixture is burned.

For example, the oxygen amount control part 83 supplies oxygen to the catalyst 61 before the air-fuel mixture is burned when startup of the internal combustion engine 10' is requested. Usually, when startup of the internal combustion engine 10' is requested, no exhaust gas remains in the exhaust passage. For this reason, by supplying oxygen to the catalyst 61 at this timing, the oxygen storage amount of the catalyst 61 can be more precisely controlled.

In the same way as the second embodiment, the oxygen amount control part 83 supplies air from the air feed device 100 to the exhaust passage to thereby supply oxygen to the catalyst 61. Electric power is supplied to the air feed device 100 from the battery 20. Further, the oxygen amount control part 83 changes the air amount supplied from the air feed device 100 to the exhaust passage to control the amount of supply of oxygen to the catalyst 61.

<Processing for Supply of Oxygen>

Figure 20:
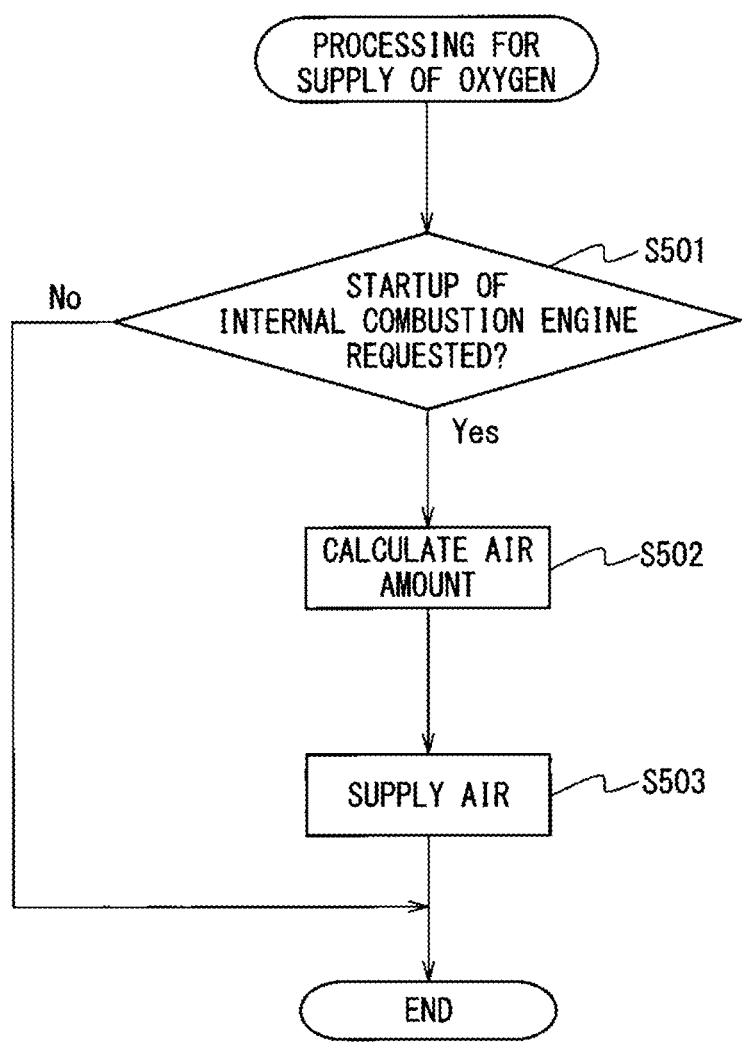
FIG. 20 is a flow chart showing a control routine of processing for supply of oxygen in the third embodiment of the present invention.

FIG. 20 is a flow chart showing the control routine of the processing for supply of oxygen in the third embodiment of the present invention. The present control routine is repeatedly performed by the ECU 70 at predetermined time intervals.

First, at step S501, the oxygen amount control part 83 judges whether startup of the internal combustion engine 10' has been requested. For example, when the state of charge (SOC) of the battery 20 has fallen to a lower limit threshold value, startup of the internal combustion engine 10' is requested. The SOC of the battery 20 is calculated based on the output of the voltage sensor 97 etc.

Next, step S502 and step S503 are performed in the same way as step S401 and step S402 of FIG. 15. After step S503, the present control routine ends. If oxygen finishes being supplied to the catalyst 61, the first motor-generator 12 is used to start up the internal combustion engine 10'.

Note that, the oxygen amount control part 83 may use the air feed device 100 to supply oxygen to the catalyst 61 after the internal combustion engine 10' is stopped. In this case, at step S501, the oxygen amount control part 83 judges whether the internal combustion engine 10' has been stopped. For example, when the SOC of the battery 20 is restored to the upper limit threshold value, stopping of the internal combustion engine 10' is requested and the internal combustion engine 10' is stopped.

Fourth Embodiment

The exhaust purification system according to a fourth embodiment is basically similar to the exhaust purification system according to the third embodiment except for the points explained below. For this reason, below, the fourth embodiment of the present invention will be explained focusing on parts different from the third embodiment.

In the fourth embodiment, the vehicle 1 is provided with the internal combustion engine 10 shown in FIG. 1, instead of the internal combustion engine 10' shown in FIG. 14. In the fourth embodiment, the exhaust purification system is further provided with a motoring device driving rotation of the crankshaft 11 of the internal combustion engine 10. In the present embodiment, the first motor-generator 12 functions as the motoring device.

When the crankshaft 11 is driven to rotate by the motoring device, air is supplied to the exhaust passage without fuel being supplied to the combustion chambers 45. Therefore, in the fourth embodiment, the oxygen amount control part 83 uses the motoring device to drive rotation of the crankshaft 11 to supply oxygen to the catalyst 61. By doing this, without providing an air feed device 100, oxygen can be fed to the catalyst 61 when the air-fuel mixture is not being burned.

Further, the longer the time when the motoring device drives the rotation of the crankshaft 11 (below, referred to as the "motoring time"), the greater the amount of supply of oxygen to the catalyst 61. For this reason, in the fourth embodiment, the oxygen amount control part 83 changes the motoring time to control the amount of supply of oxygen to the catalyst 61.

<Processing for Supply of Oxygen>

Figure 21:
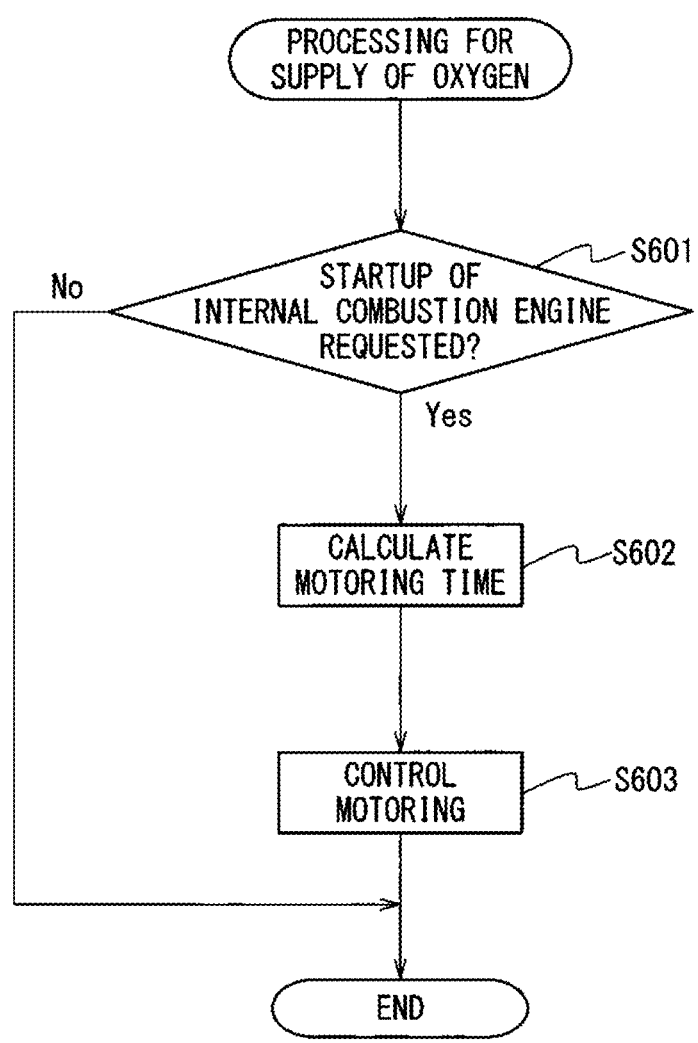
FIG. 21 is a flow chart showing a control routine of processing for supply of oxygen in a fourth embodiment of the present invention.

FIG. 21 is a flow chart showing the control routine of the processing for supply of oxygen in the fourth embodiment of the present invention. The present control routine is repeatedly performed by the ECU 70 at predetermined time intervals.

First, at step S601, in the same way as step S501 of FIG. 20, the oxygen amount control part 83 judges whether startup of the internal combustion engine 10 is requested.

Next, at step S602, the oxygen amount control part 83 calculates the motoring time based on the oxygen storage amount calculated at the control routine of FIG. 8 and the poisoning amount calculated at the control routine of FIG. 9. For example, the oxygen amount control part 83 calculates the motoring time before correction based on the oxygen storage amount, calculates the correction amount of the motoring time based on the poisoning amount, and calculates the motoring time by adding the correction amount to the motoring time before correction.

Figure 22:
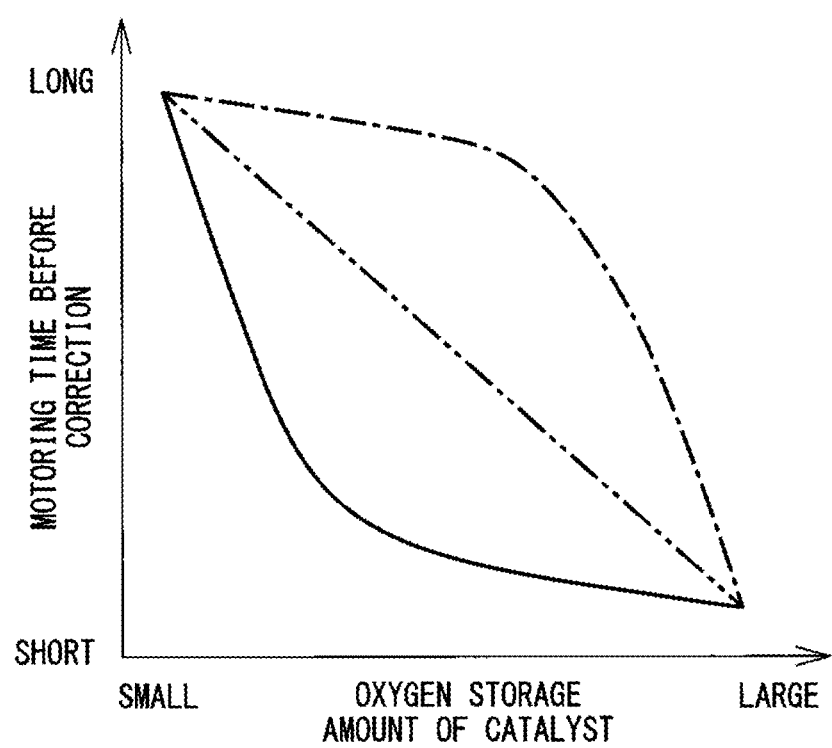
FIG. 22 is a view showing a relationship between an oxygen storage amount and a motoring time before correction.

FIG. 22 is a view showing the relationship between the oxygen storage amount and the motoring time before correction. The smaller the oxygen storage amount, the greater the amount of oxygen that must be supplied to the catalyst 61. For this reason, the motoring time before correction is made longer the smaller the oxygen storage amount. The examples of the relationship of the oxygen storage amount and the motoring time before correction are shown by the solid line, one-dot chain line, and two-dot chain line in FIG. 22. Note that, the motoring time when the oxygen storage amount is equal to or more than a predetermined value may be set to the minimum value (time required for startup of the internal combustion engine 10).

Figure 23:
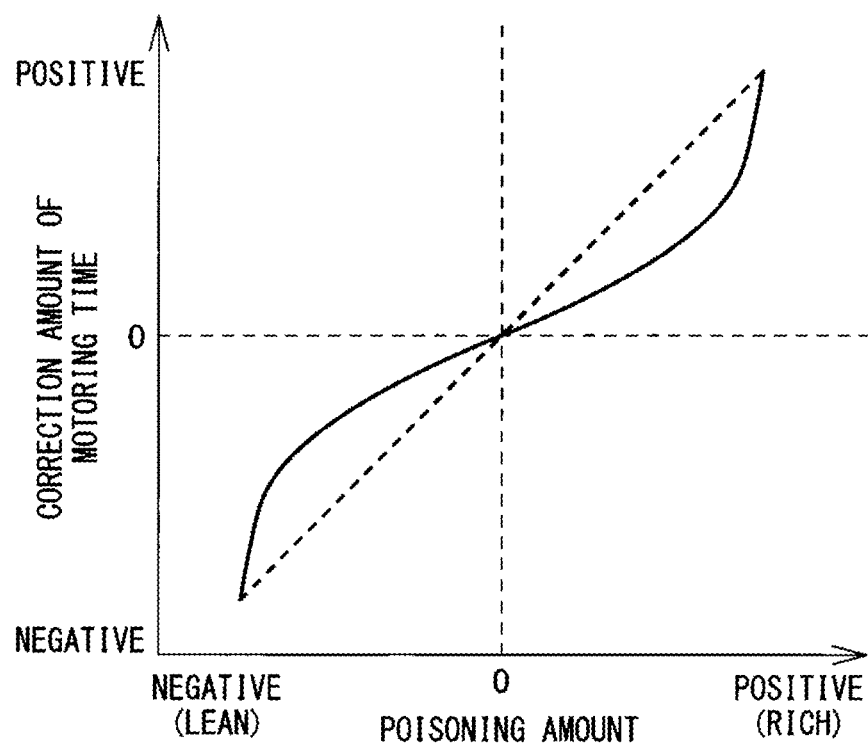
FIG. 23 is a view showing a relationship between the poisoning amount and correction amount of the motoring time.

FIG. 23 is a view showing the relationship of the poisoning amount and the correction amount of the motoring time. When the poisoning amount is positive, that is, when the catalyst 61 is poisoned rich, oxygen supplied to the catalyst 61 is used for eliminating poisoning. For this reason, in order to realize the desired oxygen storage amount, a greater amount of oxygen has to be supplied to the catalyst 61. Considering this, if the poisoning amount is positive, the correction amount of the motoring time is set to a positive value. As a result, the motoring time before correction is made longer by correction.

On the other hand, if the poisoning amount is negative, that is, if the catalyst 61 is poisoned lean, the HC and CO supplied to the catalyst 61 are used to eliminate the poisoning. The oxygen stored in the catalyst 61 is not consumed for removal of the HC and CO. For this reason, the catalyst 61 can be deemed to store greater oxygen than the actual oxygen storage amount. Considering this, if the poisoning amount is negative, the correction amount of the motoring time is set to a negative value. As a result, the motoring time before correction is made shorter by correction. Examples of the relationship between the poisoning amount and the correction amount of the air amount are shown by the solid line and broken line in FIG. 23.

The oxygen amount control part 83 uses a map such as shown in FIG. 22 to calculate the motoring time before correction based on the oxygen storage amount and uses a map such as shown in FIG. 23 to calculate the correction amount of the motoring time based on the poisoning amount.

Figure 24:
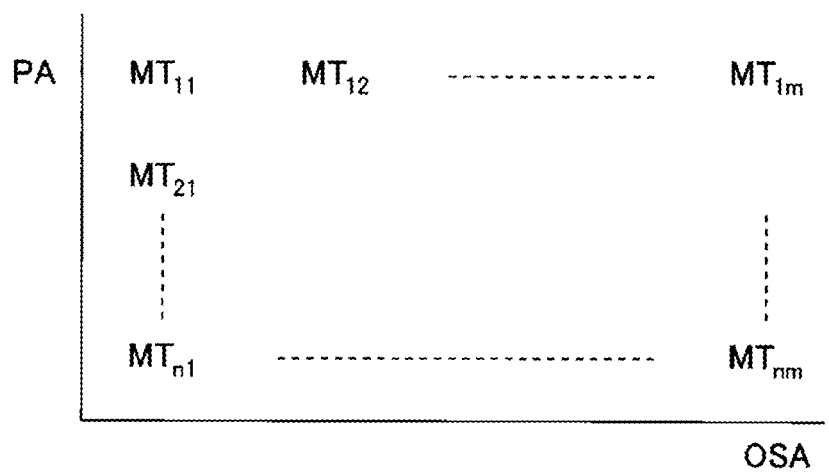
FIG. 24 is a view showing a map for calculating a motoring time based on the oxygen storage amount and the poisoning amount.

Note that, the oxygen amount control part 83 uses a two-dimensional map such as shown in FIG. 24 to calculate the motoring time MT based on the oxygen storage amount OSA and the poisoning amount PA. In this map, when the poisoning amount PA is constant, the smaller the oxygen storage amount OSA, the longer the motoring time MT is made. Further, when the oxygen storage amount OSA is constant, the larger the value of the poisoning amount PA, the longer the motoring time MT is made.

Next, at step S603, the oxygen amount control part 83 performs motoring. Specifically, the oxygen amount control part 83 drives rotation of the crankshaft 11 by the motoring device (in the present embodiment, the first motor-generator 12) for the motoring time calculated at step S602. After step S603, the present control routine ends. If the motoring device finishes driving the crankshaft 11 to rotate, the air-fuel mixture starts being burned in the combustion chambers 45 of the internal combustion engine 10.

Note that, the oxygen amount control part 83 may supply oxygen to the catalyst 61 by the motoring device after the air-fuel mixture finishes being burned when stopping of the internal combustion engine 10 is requested. In this case, at step S601, the oxygen amount control part 83 judges whether the air-fuel mixture has finished being burned.

Fifth Embodiment

An exhaust purification system according to a fifth embodiment is basically similar to the exhaust purification system according to the fourth embodiment except for the points explained below. For this reason, below, the fifth embodiment of the present invention will be explained focusing on parts different from the fourth embodiment.

If the motoring time is fixed, the larger the opening degree of the throttle valve 58 when the motoring device drives the crankshaft 11 to rotate, the greater the amount of oxygen supplied to the catalyst 61. For this reason, in the fifth embodiment, the oxygen amount control part 83 changes the opening degree of the throttle valve 58 when the motoring device drives the crankshaft 11 to rotate (below, simply referred to as the "opening degree of the throttle valve 58") so as to control the amount of supply of oxygen to the catalyst 61.

<Processing for Supply of Oxygen>

Figure 25:
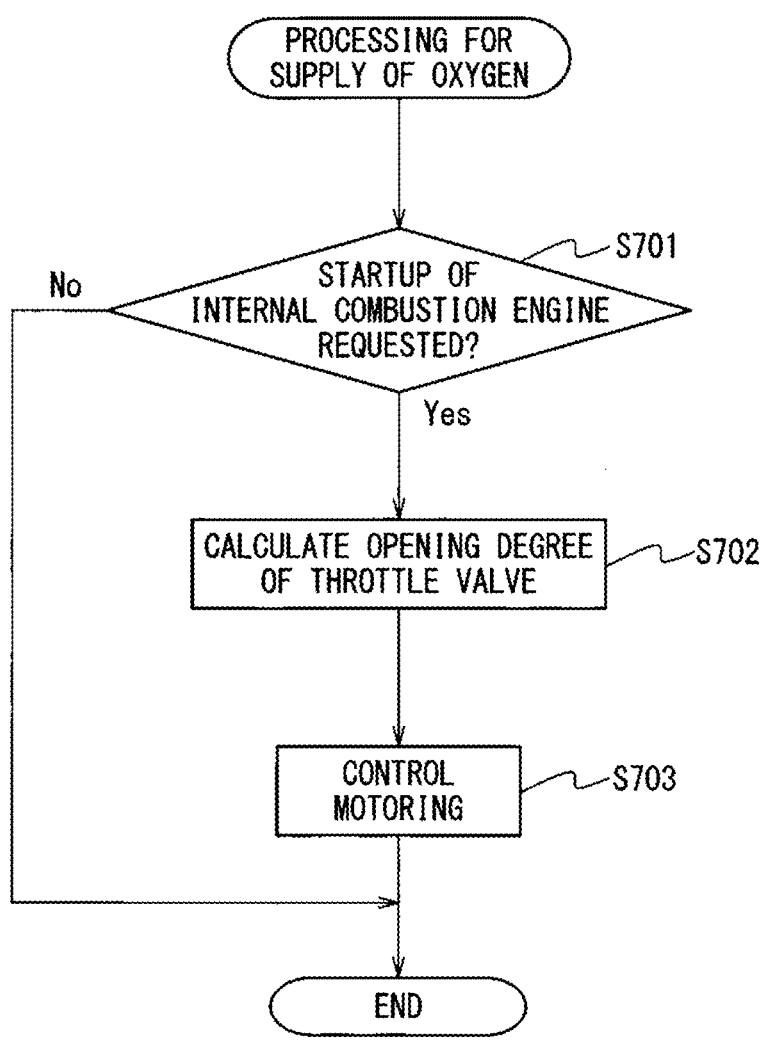
FIG. 25 is a flow chart showing a control routine of processing for supply of oxygen in a fifth embodiment of the present invention.

FIG. 25 is a flow chart showing the control routine of the processing for supply of oxygen in the fifth embodiment of the present invention. The present control routine is repeatedly performed by the ECU 70 by a predetermined time interval.

First, at step S701, in the same way as step S501 of FIG. 20, the oxygen amount control part 83 judges whether startup of the internal combustion engine 10 is requested.

Next, at step S702, the oxygen amount control part 83 calculates the opening degree of the throttle valve 58 based on the oxygen storage amount calculated at the control routine of FIG. 8 and the poisoning amount calculated at the control routine of FIG. 9. For example, the oxygen amount control part 83 calculates the opening degree of the throttle valve 58 before correction based on the oxygen storage amount, calculates the correction amount of the opening degree of the throttle valve 58 based on the poisoning amount, and adds the correction amount to the opening degree of the throttle valve 58 before correction to calculate the opening degree of the throttle valve 58.

Figure 26:
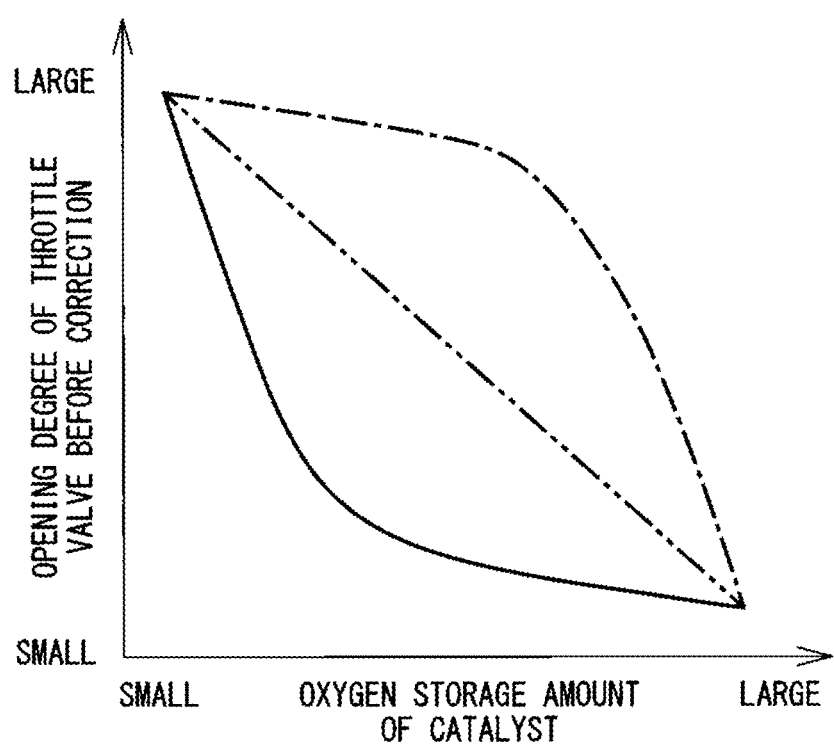
FIG. 26 is a view showing the relationship between the oxygen storage amount and an opening degree of the throttle valve before correction.

FIG. 26 is a view showing the relationship between the oxygen storage amount and the opening degree of the throttle valve 58 before correction. The smaller the oxygen storage amount, the larger the amount of oxygen which must be supplied to the catalyst 61. For this reason, the opening degree of the throttle valve 58 before correction is made larger the smaller the oxygen storage amount. Examples of the relationship between the oxygen storage amount and the opening degree of the throttle valve 58 before correction are shown by the solid line, one-dot chain line, and two-dot chain line in FIG. 26. Note that, the opening degree of the throttle valve 58 when the oxygen storage amount is equal to or more than a predetermined value may be set to a minimum value.

Figure 27:
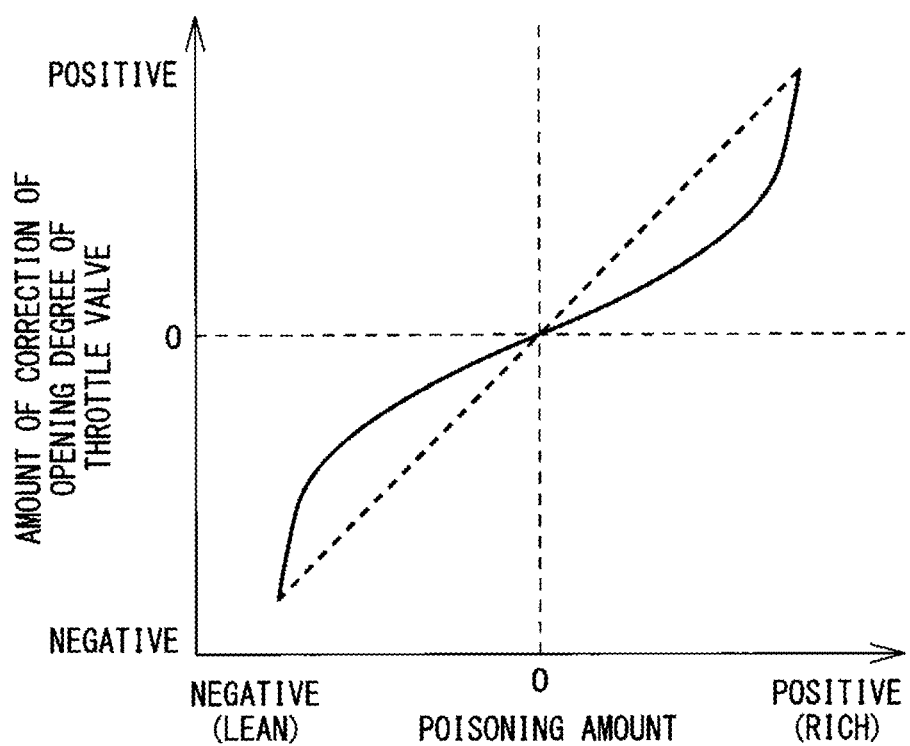
FIG. 27 is a view showing the relationship between the poisoning amount and the correction amount of the opening degree of the throttle valve.

FIG. 27 is a view showing the relationship of the poisoning amount and the correction amount of the opening degree of the throttle valve 58. If the poisoning amount is positive, that is, if the catalyst 61 is poisoned rich, the oxygen supplied to the catalyst 61 is used for elimination of the poisoning. For this reason, in order to realize the desired oxygen storage amount, a greater amount of oxygen has to be supplied to the catalyst 61. If considering this and the poisoning amount is positive, the correction amount of the opening degree of the throttle valve 58 is set to a positive value. As a result, the opening degree of the throttle valve 58 before correction is made larger by the correction.

On the other hand, if the poisoning amount is negative, that is, if the catalyst 61 is poisoned lean, the HC and CO supplied to the catalyst 61 are used for elimination of poisoning. The oxygen stored in the catalyst 61 is not consumed for purification of the HC and CO. For this reason, the catalyst 61 can be deemed to store a greater amount of oxygen than the actual oxygen storage amount. Considering this, when the poisoning amount is negative, the correction amount of the opening degree of the throttle valve 58 is set to a negative value. As a result, the opening degree of the throttle valve 58 before correction is made smaller by correction. The relationships between the poisoning amount and the correction amount of the air amount are shown by the solid line and broken line in FIG. 27.

The oxygen amount control part 83 uses a map such as shown in FIG. 26 to calculate the opening degree of the throttle valve 58 before correction based on the oxygen storage amount and uses a map such as shown in FIG. 27 to calculate the correction amount of the opening degree of the throttle valve 58 based on the poisoning amount.

Figure 28:
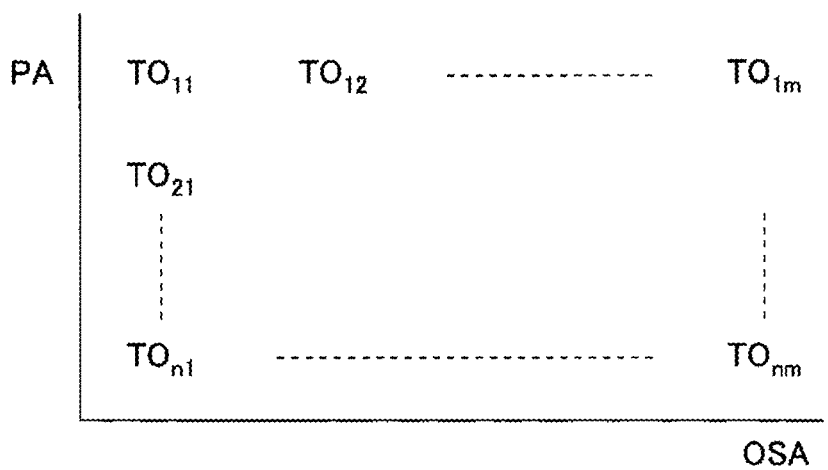
FIG. 28 is a view showing a map for calculating an opening degree of a throttle valve based on the oxygen storage amount and the poisoning amount.

Note that, the oxygen amount control part 83 may use a two-dimensional map such as shown in FIG. 28 to calculate the opening degree TO of the throttle valve 58 based on the oxygen storage amount OSA and the poisoning amount PA. In this map, if the poisoning amount PA is constant, the smaller the oxygen storage amount OSA, the larger the opening degree of the throttle valve 58 is made. Further, if the oxygen storage amount OSA is constant, the larger the value of the poisoning amount PA, the larger the opening degree of the throttle valve 58 is made.

Next, at step S703, the oxygen amount control part 83 performs motoring control. Specifically, the oxygen amount control part 83 drives the crankshaft 11 to rotate for a predetermined time by the motoring device (in the present embodiment, the first motor-generator 12). The opening degree of the throttle valve 58 at this time is controlled to a value calculated at step S702. After step S703, the present control routine ends. If the motoring device finishes driving rotation of the crankshaft 11, combustion of the air-fuel mixture is started in the combustion chamber 45 of the internal combustion engine 10.

Note that, right before the air-fuel mixture starts being burned, the opening degree of the throttle valve 58 may be made equal to or less than a predetermined value to reduce torque shock at the time of start of combustion. Further, the oxygen amount control part 83 may supply oxygen to the catalyst 61 by the motoring device after the air-fuel mixture finishes being burned when stopping of the internal combustion engine 10 is requested. In this case, at step S701, the oxygen amount control part 83 judges whether the air-fuel mixture has finished being burned.

Sixth Embodiment

The exhaust purification system according to a sixth embodiment is basically similar to the exhaust purification system according to the fourth embodiment except for the points explained below. For this reason, below, the sixth embodiment of the present invention will be explained focusing on parts different from the fourth embodiment.

Figure 29:
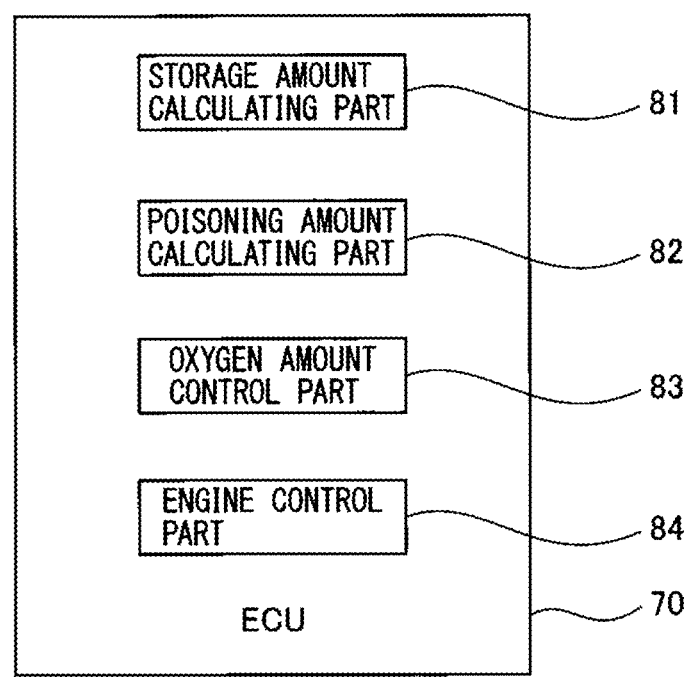
FIG. 29 is a functional block diagram of an ECU in a sixth embodiment.

FIG. 29 is a functional block diagram of the ECU 70 at the sixth embodiment. The exhaust purification system is further provided with an engine control part 84, in addition to a storage amount calculating part 81, poisoning amount calculating part 82, and oxygen amount control part 83. In the sixth embodiment, the ECU 70 has a storage amount calculating part 81, poisoning amount calculating part 82, oxygen amount control part 83, and engine control part 84. The storage amount calculating part 81, poisoning amount calculating part 82, oxygen amount control part 83, and engine control part 84 are functional blocks realized by programs stored in the ROM 73 of the ECU 70 being run by the CPU 74 of the ECU 70.

The engine control part 84 controls the startup and stopping of the internal combustion engine 10. Specifically, the engine control part 84 starts up the internal combustion engine 10 when the SOC of the battery 20 falls to the lower limit threshold value and makes the internal combustion engine 10 stop when the SOC of the battery 20 rises to the upper limit threshold value.

In this regard, if the catalyst 61 is poisoned rich, it is necessary to supply oxygen to the catalyst 61 to eliminate the rich poisoning so as to restore the exhaust purification performance of the catalyst 61. However, if oxygen is supplied to the catalyst 61 when the catalyst 61 is high in temperature, the catalyst 61 is liable to deteriorate. For this reason, it is desirable to supply oxygen to the catalyst 61 when the temperature of the catalyst 61 is low.

In the sixth embodiment, the oxygen amount control part 83 supplies oxygen to the catalyst 61 when startup of the internal combustion engine 10 is requested and before the air-fuel mixture is burned. In this case, it is possible to lengthen the stopped time of the internal combustion engine 10 to lower the temperature of the catalyst 61 at the time of supply of oxygen.

For this reason, the engine control part 84 lengthens the stop time of the internal combustion engine 10 when the temperature of the catalyst 61 is equal to or more than a predetermined temperature and the rich poisoning amount of the catalyst 61 is equal to or more than a predetermined value or more, compared to when the temperature of the catalyst 61 is less than the predetermined temperature or the rich poisoning amount of the catalyst 61 is less than the predetermined value. By doing this, it is possible to lower the temperature of the catalyst 61 at the time of supply of oxygen and in turn possible to keep the catalyst 61 from deteriorating at the time of eliminating rich poisoning.

Specifically, the engine control part 84 lowers the lower limit threshold value when the temperature of the catalyst 61 is a predetermined temperature or more and the rich poisoning amount of the catalyst 61 is a predetermined value or more compared to when the temperature of the catalyst 61 is less than the predetermined temperature or the rich poisoning amount of the catalyst 61 is less than the predetermined value.

<Explanation of Control Using Time Chart>

Figure 30:
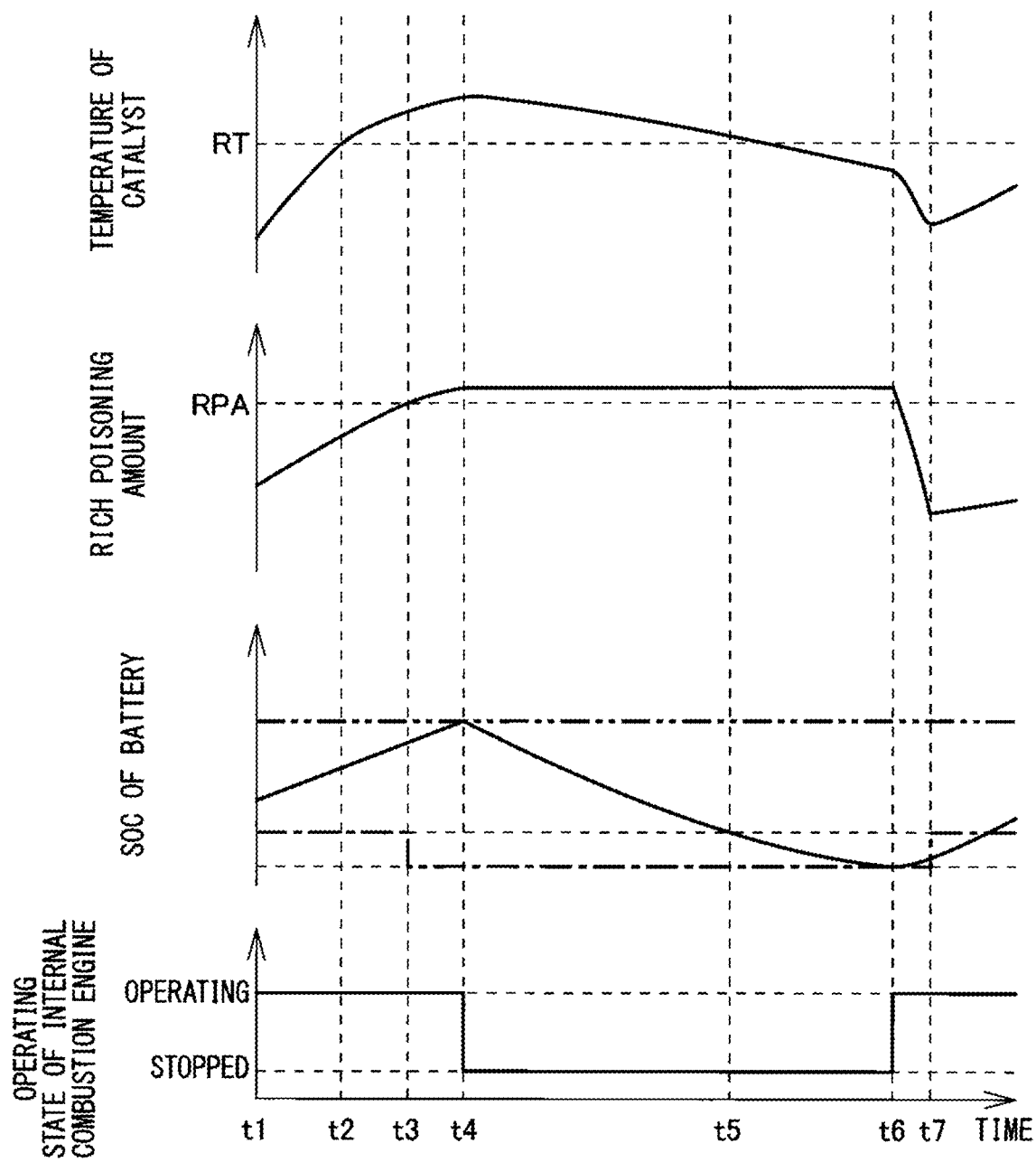
FIG. 30 is a time chart of a temperature of the catalyst etc., when control in the sixth embodiment is performed.

Below, referring to FIG. 30, the above-mentioned control will be explained in detail. FIG. 30 is a time chart of the temperature of the catalyst 61, the rich poisoning amount of the catalyst 61, the SOC of the battery 20, and the operating state of the internal combustion engine 10 when control in the sixth embodiment is performed. In the graph of the SOC of the battery 20, the lower limit threshold value is shown by the one-dot chain line, while the upper limit threshold value is shown by the two-dot chain line.

In the illustrated example, at the time t1, the internal combustion engine 10 is actuated. After the time t1, the temperature of the catalyst 61 gradually rises. At the time t2, it reaches the predetermined temperature RT. Further, after the time t1, the rich poisoning amount of the catalyst 61 gradually increases. At the time t3, it reaches the predetermined value RPA. As a result, as shown by the graph of the SOC of the battery 20, at the time t3, the lower limit threshold value is made lower.

While the internal combustion engine 10 is operating, the battery 20 is charged by the output of the internal combustion engine 10. For this reason, after the time t1, the SOC of the battery 20 gradually rises. At the time t4, it reaches the upper limit threshold value. As a result, at the time t4, shutdown of the internal combustion engine 10 is demanded and the internal combustion engine 10 is made to shut down.

While the internal combustion engine 10 is shut down, drive-use power is output by the second motor-generator 16. For this reason, after the internal combustion engine 10 is shut down, the SOC of the battery 20 gradually falls and, at the time t6, reaches the lower limit threshold value. As a result, at the time t6, startup of the internal combustion engine 10 is demanded and the internal combustion engine 10 is started up.

Further, if the internal combustion engine 10 stops, the temperature of the exhaust passage falls and the catalyst 61 is gradually cooled. For this reason, the longer the stopped time of the internal combustion engine 10, the larger the amount of drop of the temperature of the catalyst 61 becomes. In the present embodiment, by making the lower limit threshold value lower at the time t3, the startup time of the internal combustion engine 10 is extended from the time t5 to the time t6. For this reason, it is possible to lower the temperature of the catalyst 61 at the time of startup of the internal combustion engine 10.

If at the time t6 the internal combustion engine 10 is started up, from the time t6 to the time t7, the motoring device is used to drive rotation of the crankshaft 11 of the internal combustion engine 10 and supply oxygen to the catalyst 61. As a result, the rich poisoning amount becomes smaller. Further, at the time t7 where supply of oxygen to the catalyst 61 ends, the lower limit threshold value is returned to the initial value. That is, the lower limit threshold value is made higher.

<Processing for Setting Lower Limit Threshold Value>

Figure 31:
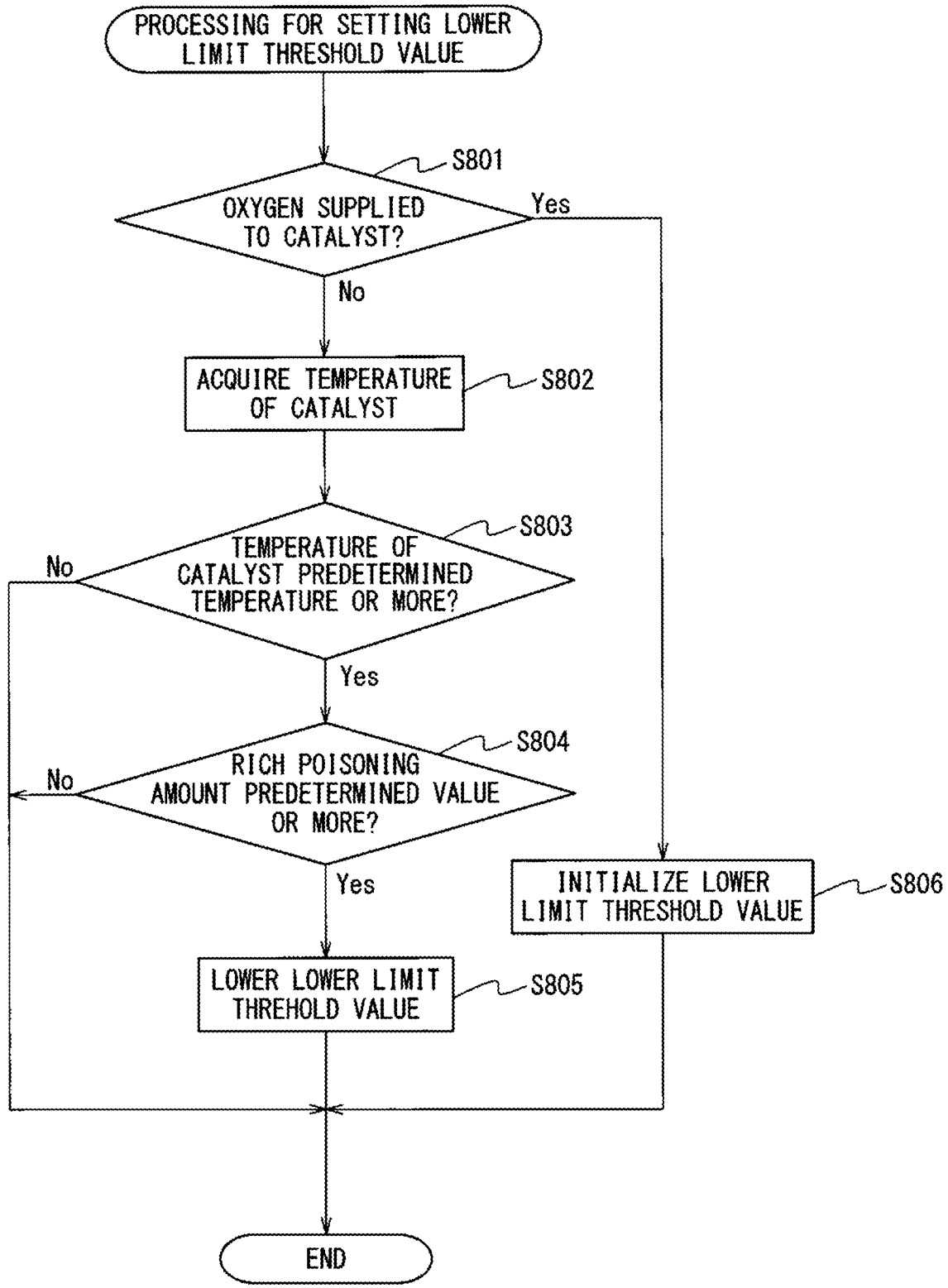
FIG. 31 is a flow chart showing the control routine of processing for setting a lower limit threshold value in the sixth embodiment of the present invention.

FIG. 31 is a flow chart showing the control routine of processing for setting the lower limit threshold value in the sixth embodiment of the present invention. The present control routine is repeatedly performed by the ECU 70 at predetermined time intervals.

First, at step S801, the engine control part 84 judges whether oxygen has been supplied to the catalyst 61 for eliminating poisoning of the catalyst 61. That is, the engine control part 84 judges whether motoring control at step S603 of FIG. 21 has been performed. If at step S801 it is judged that oxygen was not being supplied to be catalyst 61, the present control routine proceeds to step S802.

At step S802, the engine control part 84 acquires the temperature of the catalyst 61 detected by the temperature sensor 93. Note that, the temperature sensor 93 is arranged at the upstream side or downstream side of the catalyst 61. The engine control part 84 may calculate the temperature of the catalyst 61 based on the temperature of the exhaust gas detected by the temperature sensor 93. Further, the engine control part 84 may calculate the temperature of the catalyst 61, without using the temperature sensor 93, based on a predetermined status of the internal combustion engine 10 (for example, the intake air amount, engine load, etc.).

Next, at step S803, the engine control part 84 judges whether the temperature of the catalyst 61 is equal to or more than a predetermined temperature. The predetermined temperature is determined in advance and is set to a temperature where the catalyst 61 can deteriorate due to the supply of oxygen. If it is judged at step S803 that the temperature of the catalyst 61 is less than the predetermined temperature, the present control routine ends.

On the other hand, if, at step S803, it is judged that the temperature of the catalyst 61 is equal to or more than a predetermined temperature, the present control routine proceeds to step S804. At step S804, the engine control part 84 judges whether the rich poisoning amount calculated at the control routine of FIG. 9 is equal to or more than a predetermined value. The predetermined value is set in advance. Note that, if the amount of poisoning calculated by the poisoning amount calculating part 82 is negative, that is, if the catalyst 61 is poisoned lean, the rich poisoning amount becomes zero. If at step S804 it is judged that the rich poisoning amount is less than the predetermined value, the present control routine ends.

On the other hand, if, at step S804, it is judged that the rich poisoning amount is equal to or more than the predetermined value, the present control routine proceeds to step S805. At step S805, the engine control part 84 lowers the lower limit threshold value. Specifically, the engine control part 84 sets the lower limit threshold value to a value lower than an initial value of a predetermined lower limit threshold value. After step S805, the present control routine ends.

Further, if at step S801 it is judged that oxygen has been supplied to the catalyst 61, the present control routine proceeds to step S806. At step S806, the poisoning amount calculating part 82 initializes the lower limit threshold value. That is, the poisoning amount calculating part 82 returns the lower limit threshold value to the initial value. After step S806, the present control routine ends.

Note that, even if the temperature of the catalyst 61 temporarily becomes higher than the predetermined temperature during operation of the internal combustion engine 10, the temperature of the catalyst 61 may become less than the predetermined temperature when the internal combustion engine 10 is stopped. In this case, in order to lengthen the stopped time of the internal combustion engine 10, there is no need to lower the lower limit threshold value.

For this reason, the engine control part 84 may lower the lower limit threshold value more when, at the time the internal combustion engine 10 is stopped, the temperature of the catalyst 61 is equal to or more than a predetermined temperature and the rich poisoning amount is equal to or more than a predetermined value, compared to when, at the time the internal combustion engine 10 is stopped, the temperature of the catalyst 61 is less than the predetermined temperature or the rich poisoning amount is less than the predetermined value. By doing this, the lower limit threshold value is made lower only when there is a high possibility that the catalyst 61 will deteriorate and therefore the battery 20 can be kept from deteriorating due to a drop in the SOC of the battery 20.

In this case, in the example of FIG. 30, the lower limit threshold value is made lower at the time t4 when the internal combustion engine 10 is stopped. Further, in this case, before step S802 of FIG. 31, it is judged if the internal combustion engine 10 has been stopped, and if it is judged that the internal combustion engine 10 has been stopped, the present control routine proceeds to step S802.

Further, as explained above, the engine control part 84 makes the internal combustion engine 10 stop when the SOC of the battery 20 rises to the upper limit threshold value. However, the engine control part 84 may make the internal combustion engine 10 stop when another condition is satisfied. In this case as well, by lowering the lower limit threshold value, it is possible to lengthen the stopped time of the internal combustion engine 10.

Seventh Embodiment

An exhaust purification system according to a seventh embodiment is basically similar to the exhaust purification system according to the sixth embodiment except for the points explained below. For this reason, below, the seventh embodiment of the present invention will be explained focusing on parts different from the sixth embodiment.

In the seventh embodiment, in the same way as the sixth embodiment, the engine control part 84 starts up the internal combustion engine 10 when the SOC of the battery 20 falls to the lower limit threshold value and makes the internal combustion engine 10 stop when the SOC of the battery 20 rises to the upper limit threshold value. Further, the engine control part 84 raises the upper limit threshold value more when the temperature of the catalyst 61 is equal to or more than a predetermined temperature and the rich poisoning amount of the catalyst 61 is equal to or more than a predetermined value, compared to when the temperature of the catalyst 61 is less than the predetermined temperature or the rich poisoning amount of the catalyst 61 is less than the predetermined value. By doing this, it is possible to lengthen the stopped time of the internal combustion engine 10 and possible to lower the temperature of the catalyst 61 at the time of supply of oxygen.

<Explanation of Control Using Time Chart>

Figure 32:
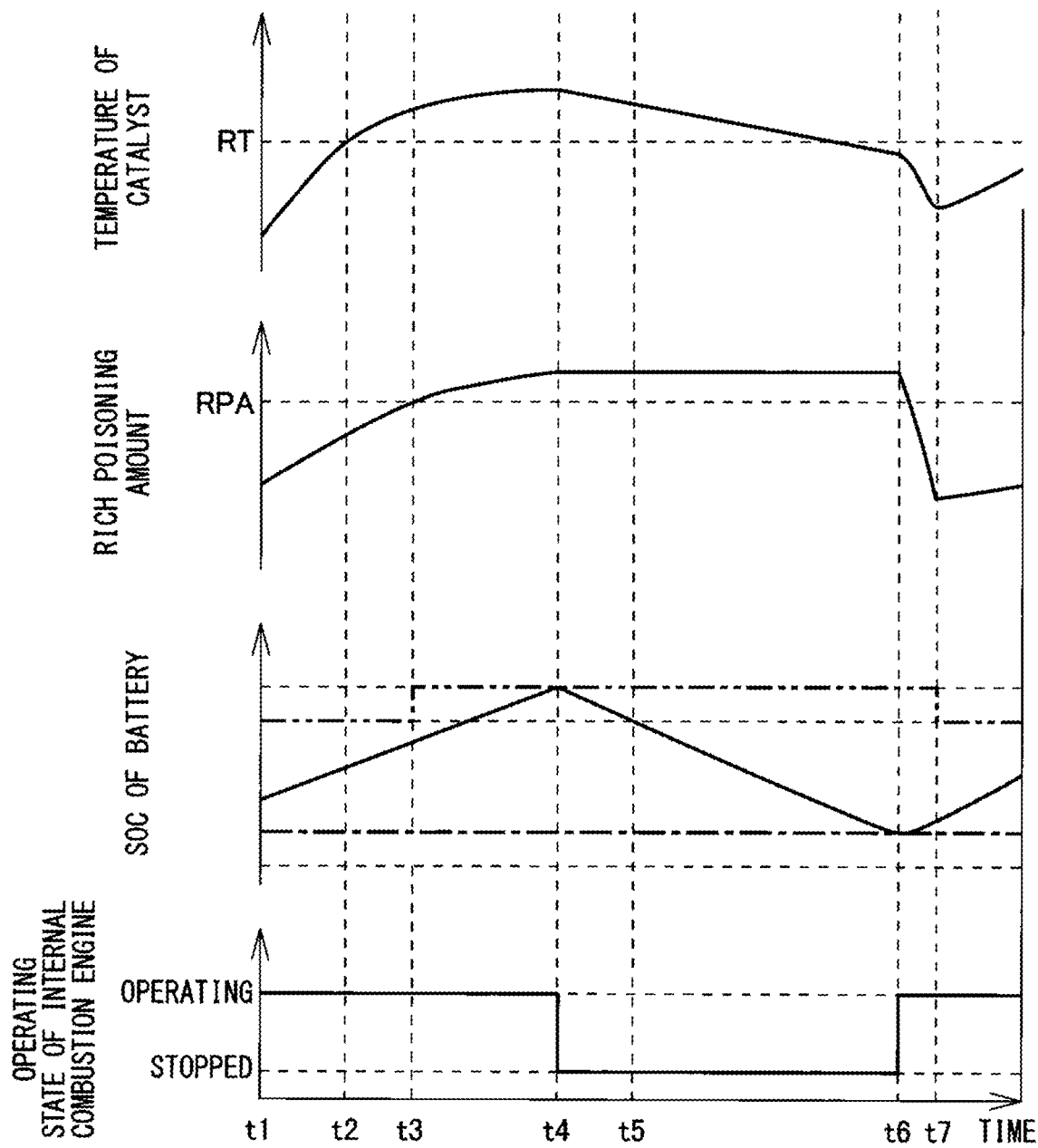
FIG. 32 is a time chart of a temperature of the catalyst etc., when control in a seventh embodiment is performed.

Below, referring to FIG. 32, the above-mentioned control will be specifically explained. FIG. 32 is a time chart of the temperature of the catalyst 61, the amount of rich poisoning of the catalyst 61, the SOC of the battery 20, and the operating state of the internal combustion engine 10 when control in the seventh embodiment is performed. In the graph of the SOC of the battery 20, the lower limit threshold value is shown by a one-dot chain line, while the upper limit threshold value is shown by a two-dot chain line.

In the illustrated example, at the time t1, the internal combustion engine 10 is operating. After the time t1, the temperature of the catalyst 61 gradually rises. At the time t2, it reaches a predetermined temperature RT. Further, after the time t1, the amount of rich poisoning of the catalyst 61 gradually increases. At the time t3, it reaches a predetermined value RPA. As a result, as shown by the graph of the SOC of the battery 20, at the time t3, the upper limit threshold value is made higher.

While the internal combustion engine 10 is operating, the battery 20 is charged by the output of the internal combustion engine 10. For this reason, after the time t1, the SOC of the battery 20 gradually rises. At the time t4, it reaches the upper limit threshold value. As a result, at the time t4, shutdown of the internal combustion engine 10 is requested and the internal combustion engine 10 is made to stop.

While the internal combustion engine 10 is stopped, the power for drive is output by the second motor-generator 16. For this reason, after stopping the internal combustion engine 10, the SOC of the battery 20 gradually falls. At the time t6, it reaches the lower limit threshold value. As a result, at the time t6, startup of internal combustion engine 10 is requested and the internal combustion engine 10 is started.

Further, if the internal combustion engine 10 shuts down, the temperature of the exhaust passage falls and the catalyst 61 is gradually cooled. For this reason, the longer the stopped time of the internal combustion engine 10, the greater the amount of fall of temperature of the catalyst 61. In the present embodiment, at the time t3, the upper limit threshold value is raised whereby the stopped time of the internal combustion engine 10 is extended by the time from the time t4 to the time t5. For this reason, it is possible to lower the temperature of the catalyst 61 at the time of startup of the internal combustion engine 10.

If at the time t6 the internal combustion engine 10 is started up, from the time t6 to the time t7, the motoring device is used to drive rotation of the crankshaft 11 of the internal combustion engine 10 and oxygen is supplied to the catalyst 61. As a result, the rich poisoning amount becomes smaller. Further, at the time t7 where the supply of oxygen to the catalyst 61 ends, the upper limit threshold value is returned to the initial value. That is, the upper limit threshold value is made lower.

<Processing for Setting Upper Limit Threshold Value>

Figure 33:
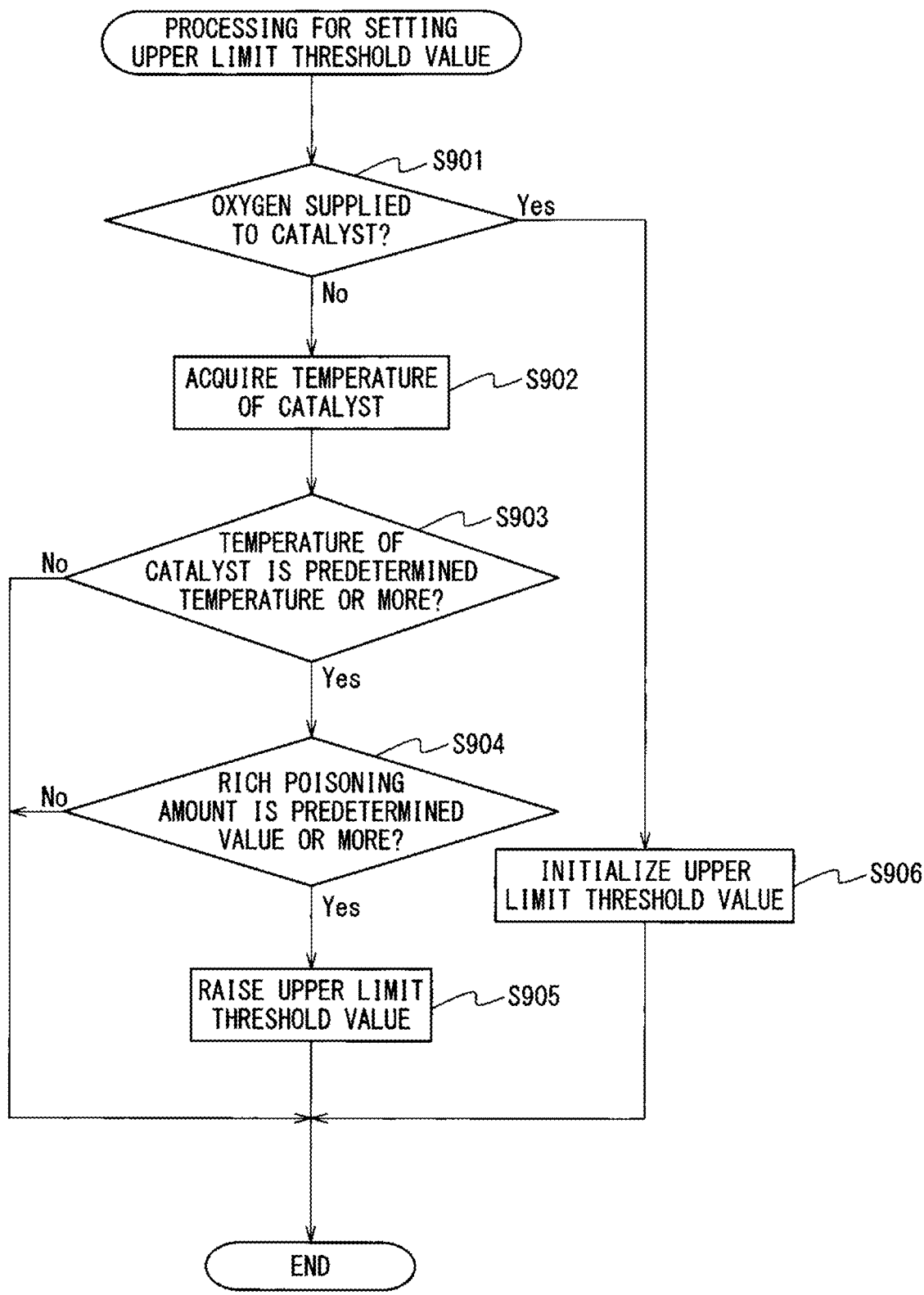
FIG. 33 is a flow chart showing the control routine of processing for setting an upper limit threshold value in the seventh embodiment of the present invention.

FIG. 33 is a flow chart showing a control routine of processing for setting the upper limit threshold value in the seventh embodiment of the present invention. The present control routine is repeated performed by the ECU 70 at predetermined time intervals.

Step S901 to step S904 are performed in the same way as step S801 to step S804 of FIG. 31. If at step S904 it is judged that the rich poisoning amount is equal to or more than a predetermined value, the present control routine proceeds to step S905. At step S905, the engine control part 84 raises the upper limit threshold value. Specifically, the engine control part 84 sets the upper limit threshold value to a value higher than the initial value of the upper limit threshold value determined in advance. After step S905, the present control routine ends.

Further, if at step S901 it is judged that oxygen has been supplied to the catalyst 61, the present control routine proceeds to step S906. At step S906, the poisoning amount calculating part 82 initiates the upper limit threshold value. That is, the poisoning amount calculating part 82 returns the upper limit threshold value to the initial value. After step S906, the present control routine ends.

Other Embodiments

Above, preferred embodiments according to the present invention were explained, but the present invention is not limited to these embodiments and can be corrected and changed in various ways within the language of the claims.

For example, in the first embodiment to seventh embodiment, the correction amount when the amount of poisoning calculated by the poisoning amount calculating part 82 is negative, that is, when the catalyst 61 is poisoned lean, may be set to zero. That is, the oxygen amount control part 83 may control the amount of supply of oxygen to the catalyst 61 based on the oxygen storage amount and rich poisoning amount.

Further, in the first embodiment to seventh embodiment, the correction amount when the amount of poisoning calculated by the poisoning amount calculating part 82 is positive, that is, when the catalyst 61 is poisoned rich, may be set to zero. That is, the oxygen amount control part 83 may control the amount of supply of oxygen to the catalyst 61 based on the oxygen storage amount and lean poisoning amount.

Further, in the fourth embodiment or fifth embodiment, if the vehicle 1 is provided with a motor able to drive rotation of the crankshaft 11 of the internal combustion engine 10 when the air-fuel mixture is not being burned, as a motoring device, the vehicle 1 may be provided with just an internal combustion engine 10 as the source of drive power for driving.

Further, the oxygen amount control part 83 may combine the above-mentioned methods to control the amount of supply of oxygen to the catalyst 61. For example, in the second embodiment, the oxygen amount control part 83 may change the air-fuel ratio of the air-fuel mixture and the air amount supplied from the air feed device 100 to the exhaust passage so as to control the amount of supply of oxygen to the catalyst 61. Further, in the third embodiment to seventh embodiment, the oxygen amount control part 83 may change at least two of the air amount supplied from the air feed device 100 to the exhaust passage, the motoring time, and the opening degree of the throttle valve 58 to control the amount of supply of oxygen to the catalyst 61. That is, in the fourth embodiment to seventh embodiment, the vehicle 1 may be provided with an internal combustion engine 10' provided with an air feed device 100 (FIG. 14) instead of the internal combustion engine 10 (FIG. 1).

REFERENCE SIGNS LIST

10, 10'. internal combustion engine
61. catalyst
70. electronic control unit (ECU)
81. storage amount calculating part
82. poisoning amount calculating part
83. oxygen amount control part

The invention claimed is:

1. An exhaust purification system of an internal combustion engine, the exhaust purification system comprising:
    a catalyst arranged in an exhaust passage of the internal combustion engine and able to store oxygen; and
    a processor configured to
        calculate an oxygen storage amount of the catalyst,
        calculate a poisoning amount of the catalyst, and control an amount of oxygen supplied to the catalyst based on the oxygen storage amount and the poisoning amount, wherein
the processor is configured to supply oxygen to the catalyst when startup of the internal combustion engine is requested,
a vehicle mounting the internal combustion engine comprises the internal combustion engine and a motor as sources of power for driving, and
the processor is configured to
control startup and stopping of the internal combustion engine,
calculate a rich poisoning amount of the catalyst by exhaust gas of an air-fuel ratio richer than the stoichiometric air-fuel ratio, and
lengthen a stopped time of the internal combustion engine more when a temperature of the catalyst is equal to or more than a predetermined temperature and the rich poisoning amount is equal to or more than a predetermined value, compared to when the temperature of the catalyst is less than the predetermined temperature or the rich poisoning amount is less than the predetermined value.

2. The exhaust purification system according to claim 1, wherein
the processor is configured to control the amount of oxygen based on the rich poisoning amount.

3. The exhaust purification system according to claim 1, wherein
the processor is configured to
calculate a lean poisoning amount of the catalyst by exhaust gas of an air-fuel ratio leaner than the stoichiometric air-fuel ratio, and
control the amount of oxygen based on the lean poisoning amount.

4. The exhaust purification system according to claim 1, further comprising an air feed device directly supplying air into the exhaust passage at an upstream side from the catalyst, wherein
the processor is configured to control the amount of oxygen by changing an air amount supplied from the air feed device to the exhaust passage.

5. The exhaust purification system according to claim 1, wherein the processor is configured to control the amount of oxygen by changing an air-fuel ratio of an air-fuel mixture supplied to a combustion chamber of the internal combustion engine.

6. The exhaust purification system according to claim 1, wherein the processor is configured to start up the internal combustion engine when a state of charge of a battery supplying electric power to the motor falls to a lower limit threshold value, and lower the lower limit threshold value more when the temperature of the catalyst is equal to or more than the predetermined temperature and the rich poisoning amount is equal to or more than the predetermined value, compared to when the temperature of the catalyst is less than the predetermined temperature or the rich poisoning amount is less than the predetermined value.

7. The exhaust purification system according to claim 6, wherein the processor is configured to lower the lower limit threshold value more when, at the time of stopping the internal combustion engine, the temperature of the catalyst is equal to or more than the predetermined temperature and the rich poisoning amount is equal to or more than the predetermined value, compared to when, at the time of stopping the internal combustion engine, the temperature of the catalyst is less than the predetermined temperature or the rich poisoning amount is less than the predetermined value.

8. The exhaust purification system according to claim 1, wherein the processor is configured to start up the internal combustion engine when a state of charge of a battery supplying electric power to the motor falls to a lower limit threshold value, make the internal combustion engine stop when the state of charge of the battery rises to an upper limit threshold value, and raise the upper limit threshold value more when the temperature of the catalyst is equal to or more than the predetermined temperature and the rich poisoning amount is equal to or more than the predetermined value, compared to when the temperature of the catalyst is less than the predetermined temperature or the rich poisoning amount is less than the predetermined value.

9. An exhaust purification system of an internal combustion engine, the exhaust purification system comprising:
a catalyst arranged in an exhaust passage of the internal combustion engine and able to store oxygen; and
a processor configured to
calculate an oxygen storage amount of the catalyst,
calculate a poisoning amount of the catalyst, and
control an amount of oxygen supplied to the catalyst based on the oxygen storage amount and the poisoning amount, wherein
the processor is configured to supply oxygen to the catalyst when an air-fuel mixture is not being burned in a combustion chamber of the internal combustion engine,
the exhaust purification system further comprises a motoring device for driving rotation of a crankshaft of the internal combustion engine, and
the processor is configured to control the amount of oxygen by changing a time during which the motoring device drives rotation of the crankshaft.

10. An exhaust purification system of an internal combustion engine, the exhaust purification system comprising:
a catalyst arranged in an exhaust passage of the internal combustion engine and able to store oxygen; and
a processor configured to
calculate an oxygen storage amount of the catalyst,
calculate a poisoning amount of the catalyst, and
control an amount of oxygen supplied to the catalyst based on the oxygen storage amount and the poisoning amount, wherein
the processor is configured to supply oxygen to the catalyst when an air-fuel mixture is not being burned in a combustion chamber of the internal combustion engine,
the exhaust purification system further comprises a motoring device for driving rotation of a crankshaft of the internal combustion engine, and
the processor is configured to control the amount of oxygen by changing an opening degree of a throttle valve arranged in an intake passage of the internal combustion engine when the motoring device drives rotation of the crankshaft.

11. An exhaust purification system of an internal combustion engine, the exhaust purification system comprising:
a catalyst arranged in an exhaust passage of the internal combustion engine and able to store oxygen; and
an electronic control unit, wherein
the electronic control unit is configured to
calculate an oxygen storage amount of the catalyst,
calculate a poisoning amount of the catalyst, and control an amount of oxygen supplied to the catalyst based on the oxygen storage amount and the poisoning amount, the electronic control unit is configured to supply oxygen to the catalyst when startup of the internal combustion engine is requested, a vehicle mounting the internal combustion engine comprises the internal combustion engine and a motor as sources of power for driving, and the electronic control unit is configured to control startup and stopping of the internal combustion engine, calculate a rich poisoning amount of the catalyst by exhaust gas of an air-fuel ratio richer than the stoichiometric air-fuel ratio, and lengthen a stopped time of the internal combustion engine more when a temperature of the catalyst is equal to or more than a predetermined temperature and the rich poisoning amount is equal to or more than a predetermined value, compared to when the temperature of the catalyst is less than the predetermined temperature or the rich poisoning amount is less than the predetermined value.

12. The exhaust purification system according to claim 10, wherein the processor is configured to calculate a lean poisoning amount of the catalyst by exhaust gas of an air-fuel ratio leaner than a stoichiometric air-fuel ratio, and control the amount of oxygen based on the lean poisoning amount.

13. The exhaust purification system according to claim 10, wherein the processor is configured to calculate the poisoning amount of the catalyst based on a temperature of the catalyst and a flow velocity of exhaust gas.

14. The exhaust purification system according to claim 10, wherein the processor is configured to calculate a target air-fuel ratio based on the oxygen storage amount, calculate a correction amount of the target air-fuel ratio based on the poisoning amount, and correct the target air-fuel ratio by the correction amount.

15. The exhaust purification system according to claim 10, further comprising an air feed device directly supplying air into the exhaust passage at an upstream side from the catalyst, wherein the processor is configured to calculate a supplied air amount of the air feed device based on the oxygen storage amount, calculate a correction amount of the supplied air amount based on the poisoning amount, and correct the supplied air amount by the correction amount.

* * * * *